(12) United States Patent
Sridhar et al.

(10) Patent No.: US 6,324,582 B1
(45) Date of Patent: Nov. 27, 2001

(54) ENHANCED NETWORK COMMUNICATION

(75) Inventors: Manickam R. Sridhar, Holliston; Boris Boruchovich, Bedford; Steven Sigel, North Andover; Sylvain Louchez, Wrentham; Malik Z. Khan, Sherborn; Mary Sabin, Milton, all of MA (US)

(73) Assignee: Sitara Networks, Inc., Waltham, MA (US)

( * ) Notice: Subject to any disclaimer, the term of this patent is extended or adjusted under 35 U.S.C. 154(b) by 0 days.

(21) Appl. No.: 09/176,065

(22) Filed: Oct. 20, 1998

Related U.S. Application Data

(63) Continuation-in-part of application No. 09/016,120, filed on Jan. 30, 1998, now Pat. No. 6,098,108, which is a continuation-in-part of application No. 08/886,869, filed on Jul. 2, 1997.

(30) Foreign Application Priority Data

Jul. 1, 1997 (WO) .................................... PCTUS9811928

(51) Int. Cl.[7] .................................................. G06F 15/16
(52) U.S. Cl. .......................................... 709/230; 709/228
(58) Field of Search .................................. 709/203, 239, 709/230, 228, 232

(56) References Cited

U.S. PATENT DOCUMENTS

| | | | |
|---|---|---|---|
| 5,537,417 | * 7/1996 | Sharma et al. | 370/94.1 |
| 5,557,798 | * 9/1996 | Skeen et al. | 395/650 |
| 5,699,350 | * 12/1997 | Kraslavisky | 370/254 |
| 5,774,660 | * 6/1998 | Brendel et al. | 709/201 |
| 5,777,989 | * 7/1998 | McGarvey | 370/254 |
| 5,835,725 | 11/1998 | Chiang et al. . | |
| 5,923,854 | 7/1999 | Bell et al. . | |
| 6,038,603 | * 3/2000 | Joseph | 709/228 |
| 6,065,043 | * 5/2000 | Domenikos et al. | 709/203 |

FOREIGN PATENT DOCUMENTS 0 613 274 A2  8/1994  (EP) .
0 751 656 A2  1/1997  (EP) .

OTHER PUBLICATIONS

Jacobson and Braden, "TCP Extensions for Long–Delay Paths," Internet Engineering Task Force (IETC), Request for Comments (RFC) #1072, pp. 1–13, 1988.

Jacobson and Braden, "TCP Extensions for High Performance," Internet Engineering Task Force (IETC), Request for Comments (RFC) #1323, pp. 1–31, 1992.

"Xpress Transport Protocol Specification," XTP revision 4.0 manual, XTP Forum, Santa Barbara, CA, 1995.

Microsoft, "Windows Sockets 2 Application Programming Interface," revision 2.1.0., chapters 1–2, manual, 1996.

* cited by examiner

Primary Examiner—Zarni Maung
(74) Attorney, Agent, or Firm—Fish & Richardson P.C.

(57) ABSTRACT

A communication system in which client and server communication systems are coupled over a data network. A request to communicate with one of the server communication systems is accepted and based on an identification of the server communication system in the request, one of a set of transport layer protocols is selected for communication between the client and server systems. The set of transport layer protocols can be determined by retrieving information from a directory service computer, such as an Internet Domain Name Server (DNS), where the address of the directory service computer is related to the identification of the server communication system. In addition, the server communication system can include an address translation table that associates a network address provided by a client communication system with local network addresses of server computers. The server communication system selects one of the server computers in response to a request from the client communication system and passes communication between the client system and the selected server computer.

12 Claims, 27 Drawing Sheets

ENHANCED NETWORK COMMUNICATION

CROSS REFERENCE TO RELATED APPLICATIONS

This application is a continuation-in-part of U.S. Ser. No. 09/016,120, filed on Jan. 30, 1998, now U.S. Pat. No. 6,098,108, which is a continuation in part of U.S. Ser. No. 08/886,869, filed on Jul. 2, 1997. This application also claims the benefit of PCT International Application Ser. No. PCT/US98/11928 filed on Jul. 1, 1997.

BACKGROUND OF THE INVENTION

The invention relates to a distributed directory of information related to enhanced communication between computers coupled over a data network, such as enhanced communication between client and server computers coupled through the Internet.

The Internet has become a ubiquitous tool for accessing and retrieving information, and for conducting business in general. Accessing and displaying distributed linked multimedia documents on the Internet, known as browsing pages on the World Wide Web (the "Web"), has become an essential part of information retrieval both for business and pleasure. The Internet has brought previously hard to find information to everyone's fingertips. Devices such as commerce servers are now enabling business transactions to be conducted through the Internet. Due in part to the convenience of obtaining information and carrying out commercial transactions, people are joining the Internet community at a very rapid pace. This explosive growth of the number of users and the popularity of the available services has put a strain on the network which has become congested. This congestion has lead to users experiencing undue delays while trying to retrieve information and communicate through the network. The congestion also leads to the Internet behaving inconsistently. One can experience almost instantaneous response at certain times of the day, while it may appear to be impossible to reach the same server at other times of the day. Long delays and inconsistency diminish the user experience and may result in lost business opportunities.

Referring to FIG. 1, client and server computers C1–C9, S1–S4 (that is, computers executing the client and server applications) are coupled to the Internet 100. The Internet itself includes high speed ("backbone") data connections typically operating at data rates in the range of 45 Mb/s (e.g., T3 capacity telephone trunks) or higher connected by switches or routers that forward packets towards their destinations. Computers C1–C9, S1–S4 are connected to the Internet through network Points of Presence (POPs) 110a–110d. A POP typically includes routers 112a–112d that are coupled to the Internet through data connections 114a–114d each having a capacity typically in the range of 1.5 Mb/s (e.g., a T1 capacity telephone connection) to 45 Mb/s (T3 capacity). Client computers C1–C3 can connect to a POP in a variety of ways, including those described below.

Client computers C1–C3 connect directly to a POP 110a over slow-speed, telephone modem connections 121–123 communicating a data rates in the range of 28 kb/s to 56 kb/s.

Clients computers C4–C6 are connected to each other within a single location using a local area network (LAN) 130 and a single computer or router serves as a gateway device 132. This gateway may serve a variety of functions, including packet routing, packet filtering (a security firewall), and various types of proxy service. The connection 124 between gateway device 132 and POP 110a is similar to that of the individual clients, although the data rate is typically higher, for example, in the range of 128 kb/s (e.g., an ISDN telephone connection) to serve the requirements of the multiple clients.

Client computers C7–C9 connect directly to a POP 110b, but access a gateway device 140 at the POP that acts as a proxy server coupling the clients to a router 112b and then to the Internet. The connections 127–129 between the clients and the POP typically are slow-speed telephone modem connection. The connection between the client and the proxy server may use standard protocols or may use a proprietary protocol not generally used elsewhere in the Internet.

Servers S1–S4 are connected to POPs 110c–11od, although the communication capacity between a server site and a POP is typically 1.5 Mb/s or higher. At the server sites, local area networks 150, 152 having a capacity of 10 Mb/s or higher couple multiple servers and routers 154, 156 that are used to communicate with the POPs.

Internet communication is based on a layered model of communication protocols consistent with that published by the International Standards Organization (ISO) as shown in FIG. 2. The set of ISO protocol layers, or protocol stack, is numbered from one, at the lowest layer, to seven, at the application layer.

Communication over the Internet is based on packet-switching techniques. Addressing and transport of individual packets within the Internet is handled by the Internet Protocol (IP) corresponding to layer three, the network layer, of the ISO protocol stack. This layer provides a means for sending data packets from one host to another based on a uniform addressing plan where individual computers have unique host numbers and each computer has a logical set of numbered ports that can be addressed individually. By making use of the IP layer, a sending computer is relieved of the task of finding a route to the destination host. However, packets may be lost or damaged and are not guaranteed to be delivered in the order sent. Therefore, the sending host needs to make sure that the data sent is received successfully and that a series of individual packets is assembled appropriately.

A common denominator for the Internet is the "everything over IP" paradigm. There are protocol variations above layer three, for example, various application and transport protocols, and protocol variations below layer three, for example, various communication paths making up the network infrastructure, but layer three does not change. This allows IP to be the sole routing scheme in the Internet thereby enabling the worldwide connectivity which is a major ingredient of its success.

A transport layer protocol provides end-to-end communication between applications executing on different computers and regulates the flow of information between those applications. Rate and flow control are two examples of regulations of the flow of information. A transport layer protocol may also provide reliable transportation of information including, for example, in-sequence delivery of information and retransmission of lost or damaged information. Today, the Transmission Control Protocol (TCP) is used almost exclusively to provide end-to-end reliable (i.e., error free) data streams between computers over the Internet. TCP is layered on the IP protocol and corresponds to ISO layer four, the transport layer.

Software that supports the TCP protocol is provided on most popular operating systems, such as Microsoft Windows 95 and Windows NT, and most variants of Unix. An application using TCP is relieved of the details of creating or maintaining a reliable stream to a remote application by simply requesting that a TCP-based stream be established between itself and a specified remote system.

As a result of TCP being essentially universally accepted as the transport protocol, various client server applications have evolved which layer application-specific protocols on top of end-to-end TCP communication channels, which are in turn layered on the IP network layer. Application layer protocols for file transfer, FTP (file transfer protocol), and for Web page access, HTTP (hyper-text transfer protocol), are two examples of popular application protocols layered on TCP.

The World Wide Web implements a system in which client applications, e.g., browsers such as Netscape Navigator or Microsoft Internet Explorer, can access and display linked documents, called Web pages, through server applications using the application layer hyper-text transfer protocol, HTTP. An address of a Web page or related data, referred to as a URL (uniform resource locator), typically includes a server host name and a symbolic reference to the data. The browser typically establishes a TCP-based connection to a predetermined port on the server host. That port is monitored by the server process. The client and the server communicate using the HTTP protocol over one or more TCP connections. Today, HTTP version 1.0 is commonly used.

A Web page typically includes references (URLs) to other files that also must be retrieved in order to complete the rendering of the originally requested page. A browser interprets incoming data from a server, determines the URL of other files that are needed, and establishes concurrent TCP connections to retrieve those subordinate files as well. The subordinate files do not necessarily come from the same server. For example, a scanned image included on a Web page, such as an advertising banner, will be included in that page as a reference to a separate file on a different server. Such a scanned image file is retrieved over its own TCP connection.

TCP based communication can use an end-to-end sliding window protocol where many packets of data can be sent before requiring that data in the first packet is acknowledged by the receiver. If one packet is lost or damaged, the sender determines after a time-out period that the packet needs retransmission and the entire sequence must be restarted at the un-acknowledged packet in a "Go-Back-N" paradigm. The timeout period must be significantly greater than a typical round-trip time from one host to the other and back to avoid premature timeouts. All the packets sent after the lost or damaged packet are sent again. Since most of the packets sent after the lost or damaged packet have likely been received successfully, this error recovery procedure results in unnecessary use of communication capacity. There is no means for the receiver to simply request the missing packet using TCP. A very small window is generally used on channels with high rates of packet loss or error. A small window can result in low throughput.

FIG. 3 shows an exemplary sequence of data transfers between a representative client computer C1 and a representative server computer S1 using an end-to-end TCP channel over a communication path which is transported through POPs 110a and 110c and through the Internet 100, as shown in FIG. 1. Client computer C1 is represented in FIG. 3 by vertical line 302 and server computer S1 by vertical line 304. Time flows from top to bottom and each arrow represents a data packet traveling across the communication channel. For illustration, we assume that TCP is operating with a sliding window size of four packets. The client sends a request R1 to the server who sends back acknowledgment AR1. The server then sends a sequence of data packets D1–D4 and then must wait for an acknowledgment to D1 before proceeding. In this example, the server can start sending data as soon as it has receive the request. Acknowledgments AD1 and AD2 are received by the server who proceeds to send data packets D5 and D6. For illustration, the sixth packet D6 is lost near the midpoint of the communication path. Data packets D7–D9 are transmitted after acknowledgments AD3–AD5 are received. The server now waits to receive acknowledgment for the lost sixth packet D6. After a time-out period 310, the server retransmits the sixth packet D6' and then continues in sequence with the retransmissions D7'–D9'.

Referring to FIG. 4, using HTTP to retrieve data for a Web page which includes embedded references to other data requires several TCP exchanges. FIG. 4 shows the sequence of data transfers (without showing the acknowledgments) in which client computer C1, represented by vertical line 402 requests and receives a Web page from server computer S1, represented by vertical line 404. No transmission errors are illustrated in this case. Acknowledgments are not shown. Client computer C1 sends a request G1 to server computer S1. Server computer S1 responds with Web page P1. The client computer parses page P1 and determines that it needs two additional documents and issues requests G2 and G3. Server computer S1 receives the requests and sends data P2 and P3 concurrently to the client computer.

FIG. 5 shows an exemplary sequence of data transfers between a representative client computer C4 that is serviced by a proxy application, hosted on a gateway computer 132, and a representative server computer S1 (FIG. 1). Client computer C4 is represented by vertical line 502, gateway computer 132 is represented by vertical line 504, and server computer S1 is represented by vertical line 506. Separate TCP channels are established between client computer C4 and gateway computer 132 and between the gateway computer and server computer S1. Communication between the client computer and the gateway computer uses TCP but encapsulates application-specific requests and responses in a proxy protocol. The proxy application strips the proxy protocol from outbound packets and forwards them to the intended recipient. The proxy application therefore acts as a server from the point of view of the client application and acts as a client from the point of view of the server application. Inbound packets are received by the proxy application, wrapped with the proxy protocol and forwarded to client application. Client computer C4 sends a request G11 to gateway computer 132. Gateway computer 132 forwards the request as G12 to server computer S1. Server computer S1 responds with Web page P11 which is forwarded by gateway computer 132 to client computer C4 as P12. The client computer parses page P12 and determines that it needs two additional documents and issues requests G21 and G31 which are forwarded to server computer S1 as G22 and G32 by gateway computer 132. Server computer S1 receives the requests and sends the requested data concurrently to the gateway computer as P21 and P31. The gateway computer forward the data to the client computer as P22 and P32.

Referring to FIG. 1, a proxy application serving the same function as that hosted on gateway computer 132 described above can be hosted on proxy server 140. In this case, a sequence of data transfers between a representative client computer C7 that is serviced by a proxy server 140 at POP site 110*b* and a representative server S1 follows the same pattern as shown in FIG. 5. Although the sequence of transfers is the same, in the previous case the data rate between the client application and the proxy application is high and the connection between the proxy application and the Internet is slow, while in this case, the connection between the client application and the proxy application is slow and the connection between the proxy application and the Internet is high.

SUMMARY

In one aspect, in general, the invention is a method for communicating between a client communication system and multiple server communication systems over a data communication network. The method includes accepting a request to communicate with one of the server communication systems. Accepting the request including receiving an identification of the server communication system, for example, including a host name or a network address of the server communication system. The identification of the server communication system is then used to determine a set of one or more transport layer protocols for which the server communication system is configured to communicate and then selecting one those layer protocols for communicating with the server communication system. The client communication system then communicates with the server communication system over the data communication network using the selected transport layer protocol.

Preferred embodiments include one or more of the following features.

Determining the set of transport layer protocols can include retrieving information related to the server communication system from a directory service computer over the data communication network. The address of the directory service computer is related to the identification of the server communication system. For example, the identification of the server communication system includes a network address of the server communication system, for instance, an Internet Protocol (IP) address or a host name, and the address of the directory service computer, for instance, an Internet Domain Name Server, is determined from the network address of the server communication system.

Determining the set of protocols can further include monitoring prior communication with the server communication system and updating the set of transport layer protocols based on the monitored communication. For instance, monitoring the prior communication includes detecting portions of application layer communication, such as headers of HTTP-based communication, passing between an application and the server communication system.

In another aspect, in general, the invention is a method for communicating between a client communication system and multiple server communication systems over a data communication network. The method includes accepting a request to communicate with one of the server communication systems, including accepting a request to communicate with a server computer at a first network address over the data communication network. A second network address, which may be different than the first network address, is then selected for communicating with the server communication system. The client communication system then communicates with a computer at the second network address. Selecting the second network address can include retrieving information related to the server communication system from a directory service computer over the data communication network, where the address of the directory service computer is related to the first network address.

In another aspect, in general, the invention is a client communication system coupled to a data network for communicating with multiple server communication systems each configured to communicate with the client communication system using at least one of multiple transport layer protocols. The system includes a transport layer module implementing the transport layer protocols for communicating with the server communication systems. The system also includes a layered communication module that is coupled to the transport layer module and includes a protocol selector. The protocol selector receives a request to communicate with a requested one of the plurality of server communication systems and, using the request to communicate, chooses one the transport layer protocols for communication with the requested server system. The system further includes a directory service module coupled to the layered communication module for accessing over the data network information related to the transport layer protocols with which the requested server communication system is configured to communicate. The directory service module can include a module for retrieving the information related to the transport layer protocols from a directory service computer, such as an Internet domain name server, over the data network.

In another aspect, in general, the invention is a server communication system coupled over a data communication network to multiple client communication systems. The system includes a transport layer module for communicating with the client communication systems and one or more server application modules, and a communication application module coupled to the transport layer module. The communication application module maintains a transport layer communication stream with each of a number of client communication systems, accepts requests over the communication streams from client communication systems to communicate with the one or more server application modules, and for passes information between the client communication systems and the server application modules over the communication streams. The system further includes an address translation table for associating network addresses provided by client communication systems as identifiers of server application modules with local network addresses used for communicating between the communication application module and the server application modules. The address translation table is configured to associate more than one local network address with each network address provided by a client communication system, and the server communication system further includes a server selection module for selecting one of the local addresses in response to a request to communicate from a client communication system.

Other aspects and features will be apparent from the following description, and from the claims.

DESCRIPTION

Embodiments of this invention involve communication between a client application and a server application over a data network, such as the Internet. An example of such communication is between a client application which is a Web browser and a server application which is a Web server, although other types of client and server applications can be involved as well. Furthermore, although one application is referred to as the "client" and one as the "server," embodiments of this invention are applicable to many situations when one application communicates with another over a data network and neither is exclusively a client or a server.

In the description that follows, a client application executes on a client computer which is coupled to the data network. A server application executes on a server computer also coupled to the data network. A server site includes one or more server computers on which server applications can execute, and in some embodiments of the invention, the server site also includes an additional computer used for communication between a client application and a server application executing at the server site. From the point of view of a client application, the combination of several computers at a server site can be viewed as a "server communication system" providing services to the client application. Similarly, from the point of view of a server application, a single client computer coupled to the Internet, or multiple client computers and a gateway or proxy computer can be viewed as a "client communication system" requesting services from the server application.

Several embodiments of the invention substantially share common functionality implemented in software modules executing on various computers, including client and server computers as well as other computers, such as gateway computers, used for communicating between client and server computers. In a first embodiment of the invention, both the client communication system and the server communication system include multiple computers. Software modules which implement the common functionality are hosted on computers other than client or server computers which host the client and server applications. In a second embodiment software modules which implement the common functionality is hosted on the client and server computers themselves. Other embodiments use various combinations of computers to host software modules.

Figure 6:
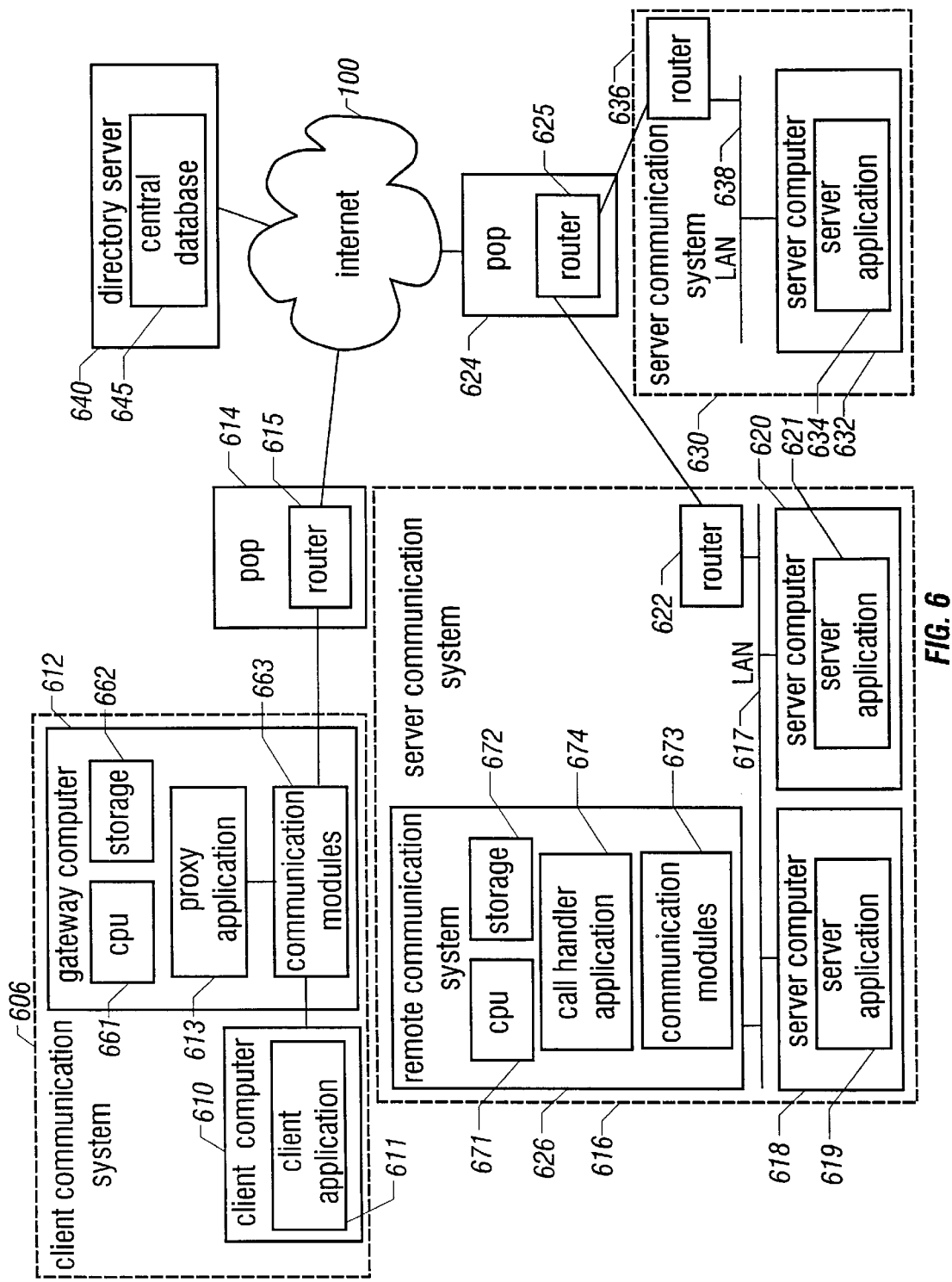
FIG. 6 illustrates a client computer and server computers coupled to the Internet and shows a gateway computer and a remote communication server used for communication between the client computer and certain server computers.

Referring to FIG. 6, a first illustrative embodiment of the invention supports communication between an exemplary client application 611 executing on a client computer 610 and exemplary server applications 619, 621, 634 executing on server computers 618, 620, 632 at server sites 616, 630. All the computers are coupled to Internet 100, which uses the Internet Protocol (IP) for network layer (ISO layer 3) communication. Client application 611 and server application 619, 621, 634 are configured to use TCP.

Client application 611 executing on client computer 610 communicates over the Internet with server computers 618, 620, 632 through a gateway computer 612 that in turn communicates with Internet 100 through POP 614. A proxy application 613 executes on gateway computer 612. Client application 611 is configured such that when it needs to establish a communication channel to a server computer, it contacts proxy application 613 with a request to establish that communication path. Once the communication channel is established further communication between client application 611 and the server computer passes through gateway computer 612 and is handled by proxy application 613. From the point of view of a server computer, client computer 610 and gateway computer 612 function as a single client communication system 606. It appears to the server computer that an application on gateway computer 612, rather than an application on client computer 610, is requesting services. For example, the address of the client computer is generally not known by the server computer. Proxy application 613 can in general handle multiple communication channels between one or more client applications and one or more remote servers.

Two server communication systems 616, 630 include server computers 618, 620 at server communication system 616 and server 632 at server system 630 coupled to LANs 617 and 638 respectively. Routers 622 and 636 are coupled to LANs 617 and 638 respectively and provide access through POP 624 to Internet 100. Server applications 619, 621, 634 are hosted on server computers 618, 620, 632 respectively. Server communication system 616 is specially configured in that it also includes a remote communication server 626 (a computer) also coupled to LAN 617. Remote communication server 626 is used to pass certain communication between router 622 and server computers 618, 620. Server communication system 630 does not include a remote communication server computer.

In this first embodiment, communication between client application 611 hosted on client computer 610 and server application 619 hosted on server computer 618 at server communication system 616 can use two different types of transport layer communication paths. A first type of transport layer communication path is made up of two TCP-based segments in series, one between client computer 610 and gateway computer 612 executing a proxy application 613, and one between gateway computer 612 and server computer 618. The path followed by the second segment passes from gateway computer 612 to router 615 at POP 614, through various communication links and routers in Internet 100, then to router 625 at POP 624, to router 622 on LAN 617 at server site 616, and finally to server computer 618.

Communication on the first segment between client computer 610 and gateway computer 612 uses TCP as the transport protocol. At the application layer, on the first segment, client application 611 communicates with proxy application 613 using a proxy protocol that incorporates application protocols used for the end-to-end application layer communication between the client application and the server application. On the second segment, proxy application 613 communicates with server application 619 using the appropriate application layer protocol for which the server application is configured. Two specific application protocols that are used to communicate between client application 611 and server applications are HTTP for accessing Web pages and data embedded in Web pages and FTP for accessing remotely stored files.

A second type of transport layer communication path between client application 611 on client computer 610 and server application 619 hosted on server computer 618 at server communication system 616 uses remote communication server 626 to forward communication between gateway computer 612 and server computer 618. Rather than communicating directly with server computer 618, gateway computer 612 communicates with remote communication server 626 which in turn communicates with server computer 618, thereby creating three separate segments on the path joining client computer 610 and server computer 618. The first segment is a direct path between client computer 610 and gateway computer 612. The second segment follows the path from gateway computer 612 to router 615 at POP 614, through various communication links and routers in Internet 100, then to router 625 at POP 624, to router 622 on LAN 617 at server site 616, and finally to remote communication server 626. The third segment is a direct path over LAN 617 between remote communication server 626 and server computer 618.

Communication on the first segment, from client computer 610 to gateway computer 612, uses the same protocols as on the same segment in the first transport layer communication path described above. Communication on the second segment joining gateway computer 612 and remote communication server 626, rather than using TCP, uses XTP, an alternate transport layer protocol on the second segment. Furthermore, when client application 611 and server application 619 are both using the HTTP application layer protocol, a data stream corresponding to that HTTP communication uses a modified HTTP protocol. Communication over the third segment from remote communication server 626 to server computer 618 uses TCP and standard application layer protocols including HTTP.

On this second type of transport layer communication path from client computer 610 to server computer 618 there are three segments at a transport layer (ISO layer 4). At the application layer (ISO layer 7) the communication path is made up of either one logical segment or three logical segments. When HTTP is not used, there is one logical segment joining the client and server application. That is, a sequence of data bytes sent by the client application are transported to the server application unmodified. When HTTP is used, there are three logical segments at the application layer. The first segment and the third segment use HTTP, while the second segment uses a modified HTTP protocol. Furthermore, a sequence of data bytes sent according the HTTP protocol from client application 611 is not necessarily delivered to server application 619. HTTP data streams received at gateway computer 612 and at remote communication server 626 are interpreted and are not necessarily passed on without modification. Gateway computer 612 and remote communication server 626 cooperate to provide the needed translation into appropriate protocols for communicating with the client and server computers.

As there is no remote communication server at server communication system 630, communication between client application 611 at client computer 610 and server application 634 at server computer 632 uses a two-segment TCP-based communication path. The first segment is between client computer 610 and gateway computer 612 executing proxy application 613, and the second segment is between gateway computer 612 and server computer 632. The second segment passes from gateway computer 612 to router 615 at POP 614, through various communication links and routers in Internet 100, then to router 625 at POP 624, to router 636 on LAN 638 at server communication system 630, and finally to server computer 632. Gateway computer 612 can concurrently support communication directly with server computers as well as via remote communication servers.

When client application 611 initiates communication with a server application, such as server application 619 or server application 634, gateway computer 612 determines whether a data path through a remote communication server can be established, or whether a direct path to a server computer must be used. A path through a remote communication server is preferred since such a path can use the alternative transport and application layer protocols described above, which results in higher data throughput and lower latency than when using a direct path and standard transport and application layer protocols to communicate between gateway computer 612 and a server computer.

Referring still to FIG. 6, gateway computer 612 includes CPU 661 and storage 662, such as a magnetic disk drive. Software stored in storage 662, when executed on CPU 661, includes proxy application 613 and communication modules 663. Communication modules 663 provide an interface for proxy application 613 to communicate with client application 611 and with server applications at the server sites coupled to Internet 100.

Remote communication server 626 includes CPU 671 and storage 672. Software stored in storage 672, when executed on CPU 671, includes call handler application 674 and communication modules 673. Communication modules 673 provide an interface for call handler application 674 to communicate with server applications 619 and 621 and proxy application 613.

Note that the term "module" generally is used to refer to a component of an operating system or an application, and "application" or "application program" is used to refer to a separate process managed by an operating system. As alternative embodiments can use different approaches to coordinate software components, the distinction between a component being a "module" or an "application" is not generally significant.

In this first embodiment illustrated in FIG. 6, a central database 645 is hosted on a directory server 640 also coupled to Internet 100. Database 645 includes information which can be used to identify a remote communication server which is be configured to communicate with a particular server computer. This database can be used by gateway computer 612 to determine whether a request to communicate with a server computer can be satisfied by establishing a communication path through a remote communication server. Each entry in the database 645 associates a network address of a server application with certain information needed to set up an indirect path to that server application through a remote communication server. A network address of a server application includes a host address and port index of a port listened to by that server application. Information needed to set up an indirect path includes the network address used to connect to an appropriate remote communication server. In addition, the database can optionally be used to indicate that a particular application layer protocol is used by the server application at a particular server application address.

In this first embodiment, as introduced above, the transport (ISO layer 4) protocol used between gateway computer 612 and remote communication server 626 is based on the express Transport Protocol (XTP). XTP is layered on the IP network protocol (ISO layer 3) which is used to route packets which make up the XTP communication between gateway computer 612 and remote communication server 626. XTP also supports bidirectional data communication over a single XTP connection.

XTP has several characteristics that differ from TCP and that give it advantages over TCP. One characteristic of XTP is that it supports use of a sliding window in combination with selective retransmission of lost or damaged packets. This combination allows efficient streaming of data over the XTP based segment joining gateway computer 612 and remote communication server 626.

Figure 7:
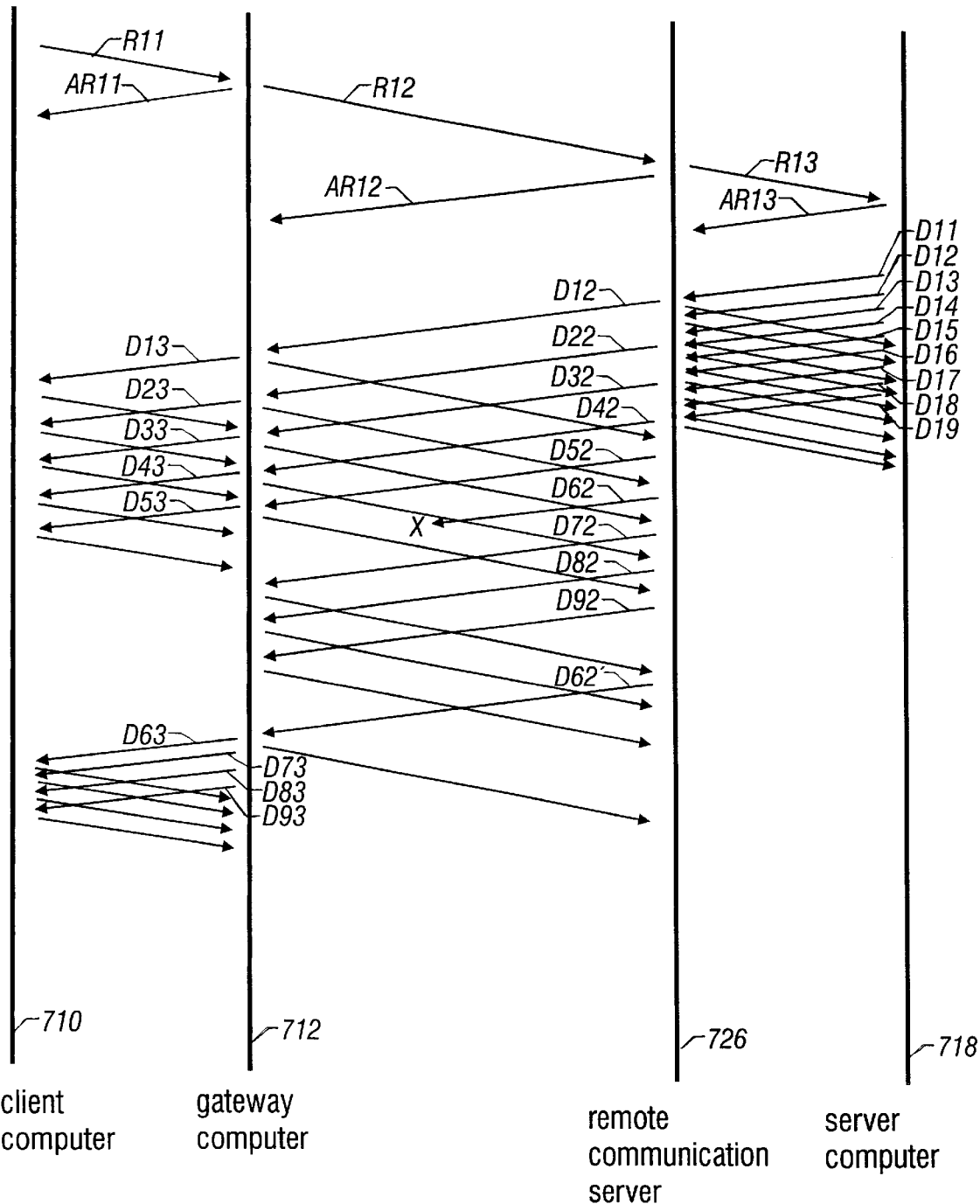
FIG. 7 shows an exemplary sequence of data transfers between a client computer and a server computer through a gateway computer and a remote communication server.

FIG. 7 illustrates an exemplary sequence of data transfers involved in sending a request and receiving a multipacket reply along a communication path (FIG. 6) from client computer 610 through gateway computer 612 and remote communication server 626 and finally to server computer 618. For illustration, vertical lines 710, 712, 726, 718 in FIG. 7 represent client computer 610, gateway computer 612, remote communication server 626 and server computer 618, respectively, and diagonal lines illustrate data and acknowledgment packets that pass between the computers along the communication path. As described above, TCP is used on the first segment between client computer 610 and gateway computer 612 as well as on the third segment from remote communication server 626 and server computer 618. XTP is used on the second segment from gateway computer 612 to remote communication server 626. In this illustration, both the first and third, TCP, segments and the second, XTP, segment operate with a sliding window sizes of four packets and each packet is explicitly acknowledged.

Figure 3:
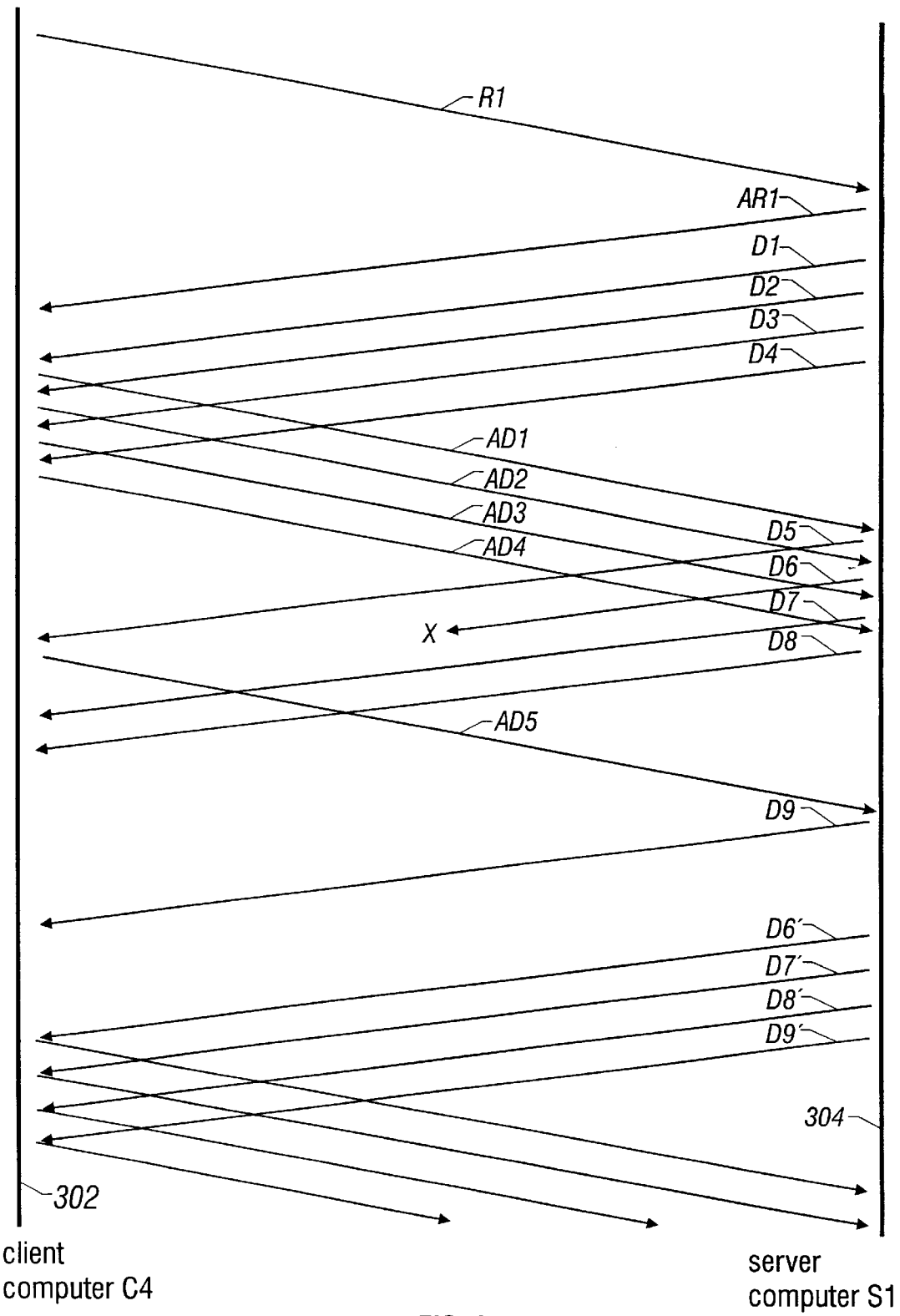
FIG. 3 shows an exemplary sequence of data transfers between a client computer and a server computer using TCP.

A request R11 from client computer 610 is forwarded by gateway computer 612 as R12, and then forwarded by remote communication server 626 as R13. Acknowledgments AR11, AR12, AR13 are sent by gateway computer 612, remote communication server 626 and server compute 618, respectively, when the corresponding request packets are received. After acknowledging receipt of request R13, server computer 618 immediately begins sending data D11–D19. Remote communication server 626 has a large buffer for data packets and quickly accepts and acknowledges all the data packets from server 618. When remote communication server 626 receives the first data packet D11, it begins sending data D12 to gateway computer 612. This continues with data packets D22–D92. In this example, it is assumed that data packet D62 is lost at a point between the server computer and the client computer and is never acknowledged. Once the remote communication server determines that the packet is lost, either by a time-out or by an explicit negative acknowledgment (NACK), the remote communication server retransmits that packet as D62'. Note that since the remote communication server has buffered the data and therefore does not have to request retransmission of the sixth packet from server 618. The gateway computer forwards data packets D12–D52 to client computer 610 as packets D13–D53 but waits for successful receipt of the sixth data packet D62' until it can deliver packets D63–D93 in the correct order to the client computer. FIG. 7 should be contrasted with FIG. 3 which illustrates a similar request, and reply on a single TCP connection. In FIG. 3, in addition to retransmitting the sixth packet, the seventh through ninth must be retransmitted as well. Also, since there is only one TCP segment, packet retransmissions must pass over the entire path from the server computer to the client computer and not simply over a portion of the path.

Other transport layer protocol characteristics in the XTP segment joining gateway computer 612 and remote communication server 626 include explicit rate control, which avoids congestion along a communication path, and multiplexing of multiple logical data streams between computers, which provides more efficient data transfer. Note that TCP does not have a similar explicit mechanism for rate control, and uses a separate instance of the TCP protocol for each logical data stream. As described more fully below, each of these characteristics yields performance advantages over using TCP.

With explicit rate control a sending computer can limit the rate at which data is sent along a communication path based on knowledge of the ability of the data path to transfer data. Referring to FIG. 6, consider the data path from remote communication server 626 and gateway computer 612. Along this path, data links of widely varying data rates are traversed. A 128 kb/s link joins gateway computer 612 and POP 614 while a 10 Mb/s link joins remote communication server 626 to router 622. If remote communication server 626 sends data significantly faster than can be passed over the 128 kb/s link from POP 614 to gateway computer 612, that data will have to be buffered somewhere along the path. This results in various inefficiencies including possible loss of a packet due to an overfull buffer, for example, a buffer at POP 614. Such a lost packet would only be discovered at the other end of the transport layer data stream, namely, at gateway computer 612 in this case. The lost data would then have to be retransmitted over the entire path. Rate control is used to limit the rate at which remote communication server 626 sends data to avoid this problem. In this case, the allowable rate of transmission from remote communication server 626 would not be significantly higher than the 128 kb/s that can be sustained on the link from POP 614 to gateway computer 612.

Multiplexing enables a computer to use a single instance of the XTP protocol executing for a pair of computers communicating using XTP to handle multiple logical data streams between the two computers. This multiplexing capability is in contrast to TCP in which a separate instance of the TCP protocol executes independently for each logical data stream. An example of a situation in which multiple data streams are passing concurrently between two computers is when a Web browser requests data to render a particular Web page. If there are embedded references to other data in a Web page, separate TCP data streams, each with a separate instance of the TCP protocol, are used to retrieve the referenced data. Using XTP, if the data is retrieved from the same computer, the multiple data streams are multiplexed and use only a single instance of the protocol.

Bidirectional data communication using XTP enables one to implicitly open a reverse data channel when a forward data channel is open. This is in contrast to TCP in which a reverse data channel must be set up using the same sequence of exchanges that are required to set up the forward data channel.

The previously mentioned modified HTTP protocol is used when a client application and a server application communicate using the HTTP protocol over an indirect communication path through a remote communication server. The modified HTTP protocol maintains the format of underlying data transported over HTTP (such as html formatted Web pages). In a first aspect of the modified HTTP protocol, multiple HTTP data streams between the client and the server are multiplexed on a single logical XTP data stream over the segment joining the remote communication server and the gateway computer. Note that multiplexing of multiple HTTP data streams onto one logical XTP data stream is different from and in addition to XTP itself multiplexing multiple logical data streams between a pair of computers for transmission using a single instance of the XTP protocol. Moreover, as is described further below, not all commands or data pass across the entire path from client application 611 to server application 619. For example, some client application commands send from the client application to the proxy application may be handled on the gateway computer and may not require services of the remote communication server or the server computer.

A second aspect of the modified HTTP protocol is that data is prefetched from server computers 618, 621 by remote communication server 626 and is sent to the gateway computer 612 in anticipation of client application 611 making an explicit request for the data. The data is buffered at gateway computer 612 until it is requested by the client application. Remote communication server 626 determines what data to prefetch based on references embedded in html format Web pages that are transferred from server computer 618 or 621 through the remote communication server to the client application.

Figure 4:
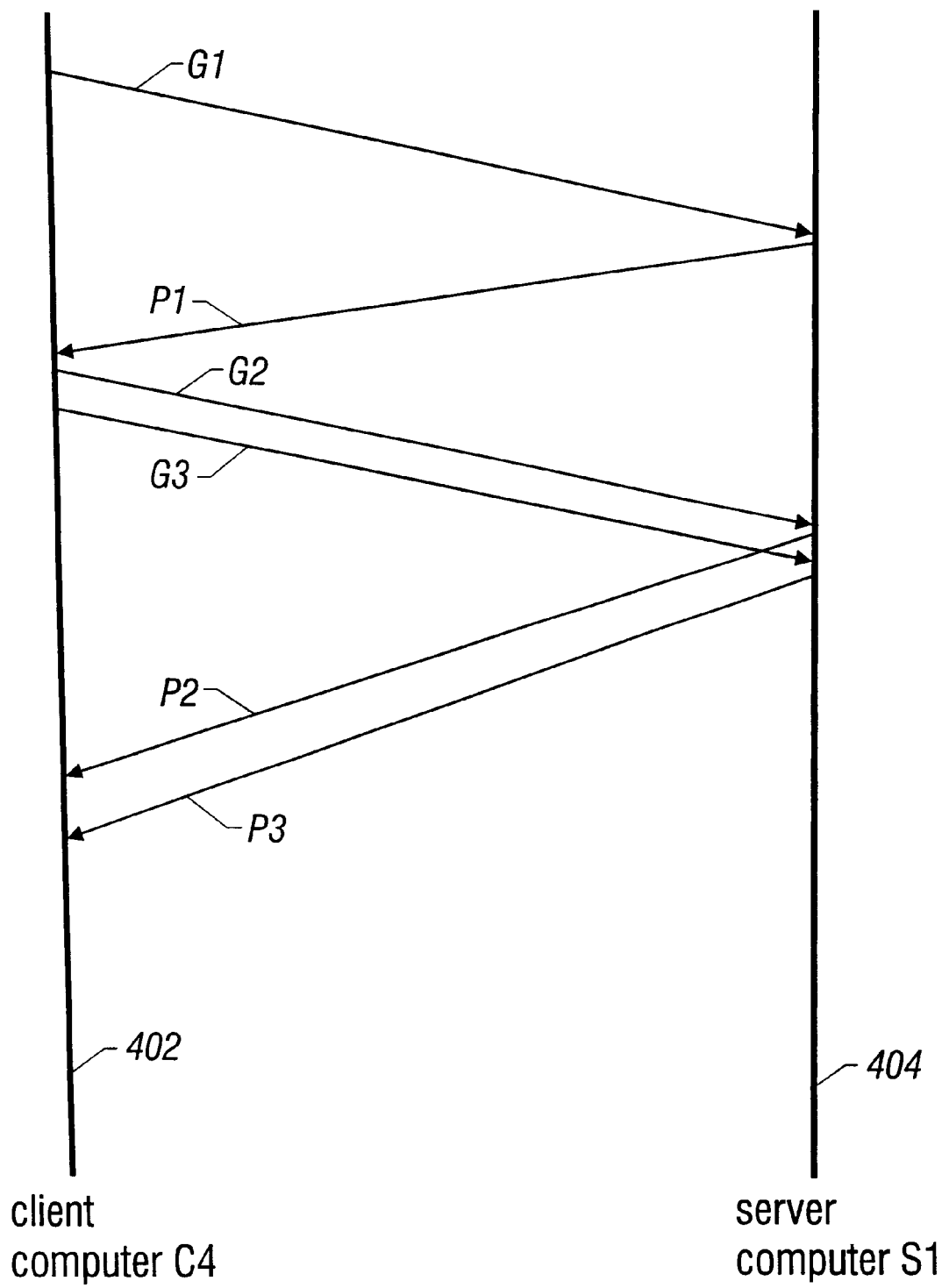
FIG. 4 shows an exemplary sequence of data transfers between a client computer and a server computer using HTTP.
Figure 5:
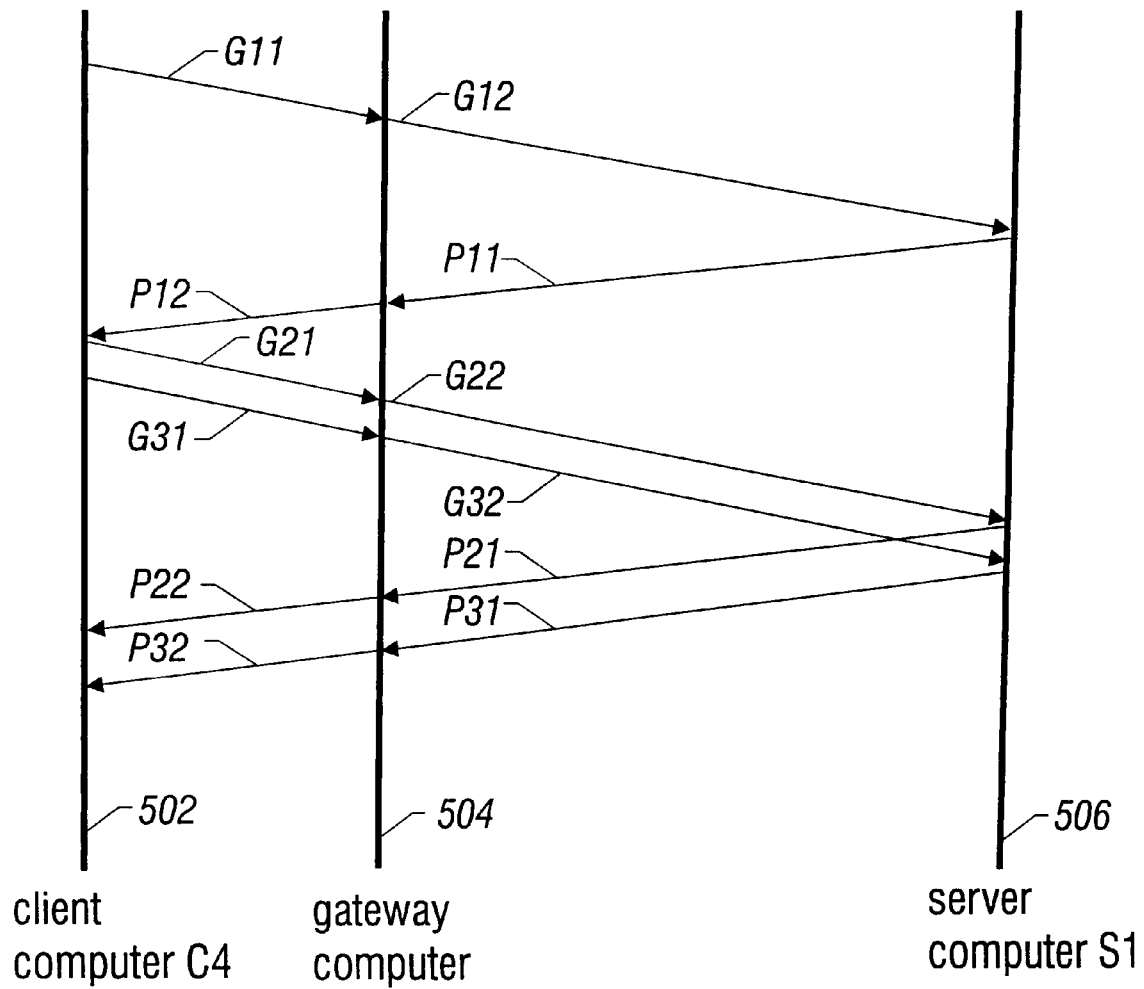
FIG. 5 shows an exemplary sequence of data transfers between a client computer and a server computer communicating through a gateway computer using TCP.
Figure 8:
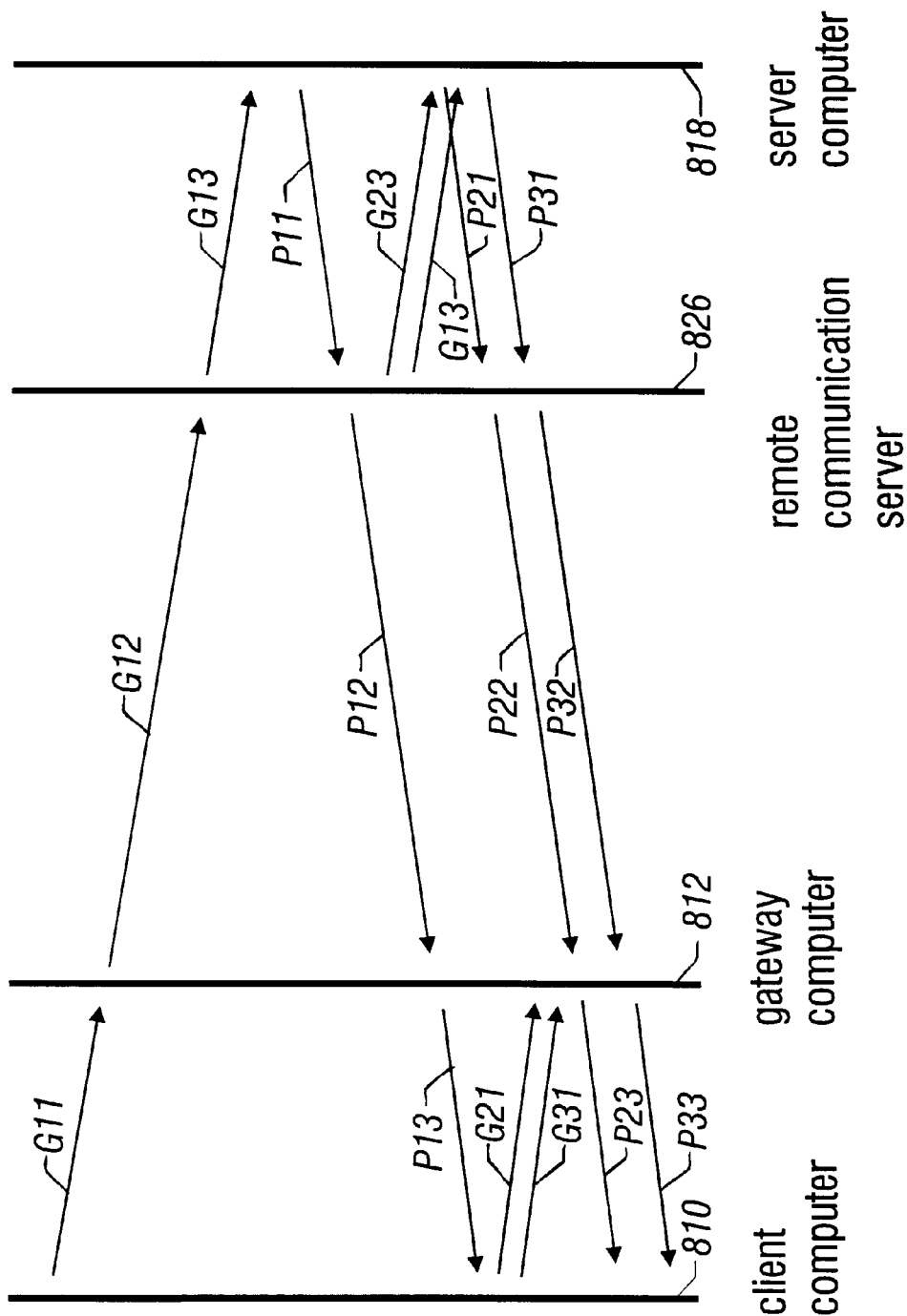
FIG. 8 shows an exemplary sequence of data transfers between a client computer and a server computer using a modified HTTP protocol.

FIG. 8 illustrates operation of the modified HTTP protocol which involves coordinated operation at the remote communication server and the gateway computer. This should be contrasted to a similar exchange using an end-to-end HTTP based connection shown in FIG. 4. Client computer 610, gateway computer 612, remote communication server 626, and server computer 618 (FIG. 6) are illustrated as vertical lines 810, 812, 826, 818, respectively, in FIG. 8. Transmission of Web page and other object requests and responses are shown as arrows with time increasing from top to bottom in the figure. Acknowledgments are not illustrated. Client computer 610 sends an initial "GET" request G11 for a Web page. Gateway computer 612 forwards the request from the client computer to remote communication server 626 as request G12. Remote communication server 626 receives G12 and requests the Web page from Web server 618 using a standard HTTP request G13. Web server 618 sends the requested page P11 to the remote communication server. Remote communication server 626 sends as page P12 to gateway computer 612, which in turn sends page P13 to client computer 610.

Remote communication server 626, in addition to forwarding page P11 received from server computer 618 to gateway computer 612 as page P12, interprets page P11 if it is in html format. Page P11 is parsed by an html parser and two embedded references to images or other objects found on that page are extracted. For illustration, two references in the received page P11 result in remote communication server 626 sending requests G23 and G33 to server computer 618. The server computer responds with data P21 and P31 which are, in turn, forwarded by the remote communication server to gateway computer 612 as P22 and P32. When this data is received by the gateway computer, it is buffered since client computer has not yet requested the data. The data is effectively "prefetched" in anticipation of client application 611 on client computer 610 requesting that data. When gateway computer receives page P12 from remote communication server 626, it forwards that page as P13 to the client computer where it is interpreted by the client application that made the ordinal request G11. The client application makes requests G21 and G22 for the same data already requested by remote communication server 626 in requests G23 and G33. Gateway computer 612 does not forward the requests G21 and G31 since the data P22 and P32 which satisfies these requests has already been received and buffered by the gateway computer. The gateway computer passes the buffered data to the client computer. From the client computer's perspective, the fact that the data was prefetched is not evident other than in that the requests are satisfied with less delay than might be expected if requests G21 and G31 had been forwarded all the way to server computer 618 before being serviced.

There are at least two situations in which remote communication server 626 anticipates a request from client computer 610 and retrieves and sends the data to satisfy the request, but client computer 610 does not make the request as expected. The first situation is when the end user aborts retrieval of a Web page interactively with client application 611. In this case, client application 611 may never request the data referenced in the references embedded in received page. According to the HTTP protocol, an abort message is sent by client computer 610 to gateway computer 612 and this abort message is forwarded to remote communication server 626. Once the remote communication server receives the abort message, further referenced data for that page is not sent. Data already sent to the gateway computer is buffered at the gateway computer but not forwarded to the client computer. In order that the buffer at gateway computer 612 does not grow too large, oldest unretrieved data is discarded by the gateway computer.

The second situation in which the requests are not made as expected for the embedded data is when the user "follows a link," that is, a user requests yet another page before the current page has been rendered and all embedded data has been received. In this case, no abort message is sent and all the data is prefetched. If the user returns to the original page, the embedded data will likely still be buffered on the gateway computer and the requests for that data can be satisfied without making another request of server computer 618.

Figure 9:
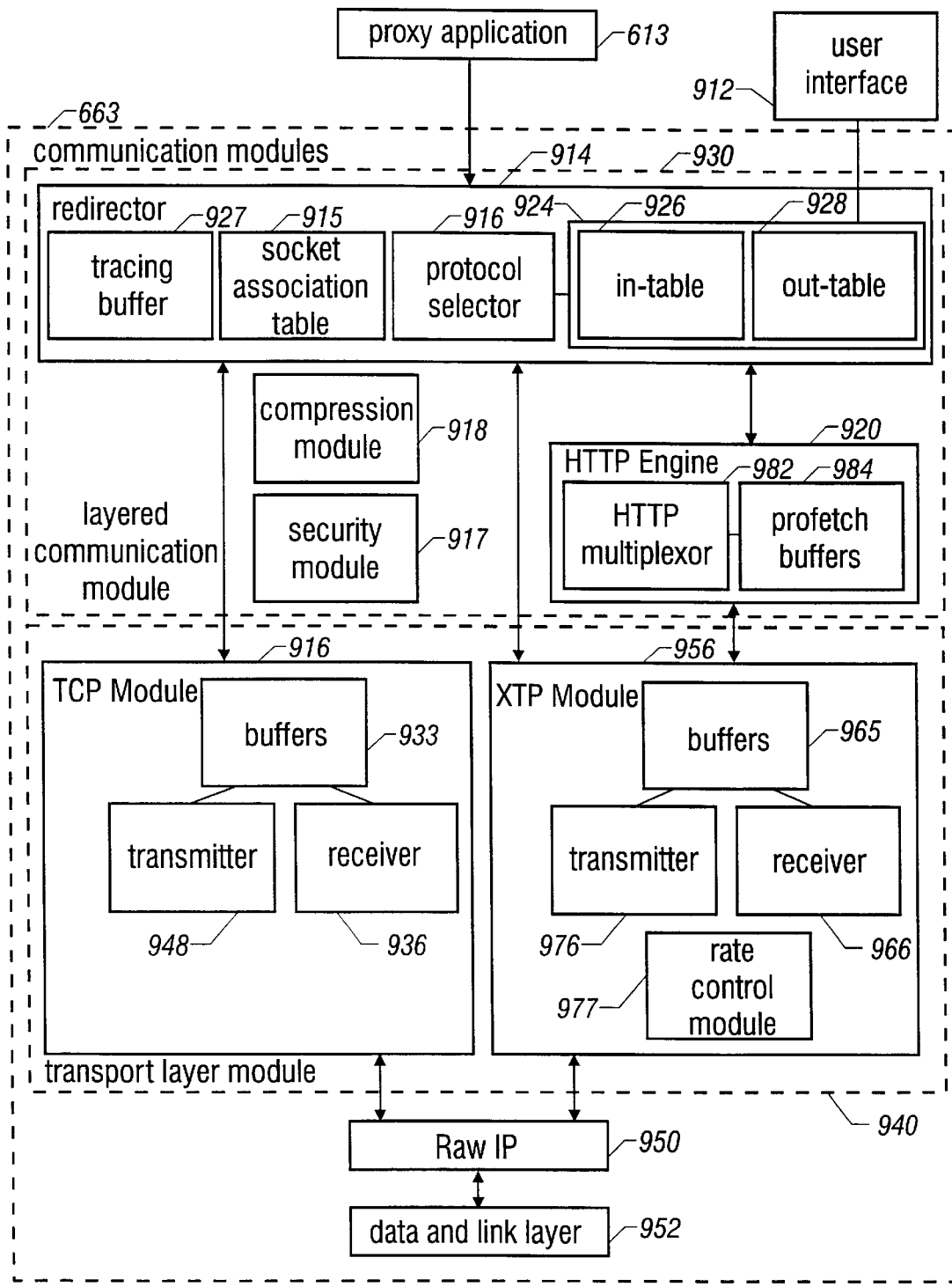
FIG. 9 shows an arrangement of software modules which execute on a gateway computer.

Referring to FIG. 9, proxy application 613 and communication modules 663 executing on gateway computer 612 implement the functionality of the gateway computer as described above. This first embodiment uses the Microsoft Windows 95 or Windows NT operating system on the gateway computer. A description of the software modules that implement the functionality of remote communication server 626 follows the description of gateway computer 612.

Proxy application 613 interacts with several software modules in order to communicate with client computer 610, server computer 618, and other server computers and remote communication servers. Proxy application 613 can be implemented in a variety of ways, including those used in a number of commercially available proxy application programs. Typically, a proxy application has a server module 902 which accepts requests from client applications executing on other computers, and a client module 904 coupled to the server module which communicates with the server systems.

In order to establish communication paths to client or server computers, proxy application 613 requests services from one or more communication software modules which implement various communication protocols. As normally configured in a typical installation of Windows 95 or Windows NT, TCP related requests from proxy application 613 would be passed directly to transport layer modules 940 which include TCP module 916. In this embodiment, a layered communication module 930 is coupled between proxy application 613 and transport layer modules 940. Layered communication module 930 includes a software interface module, a "hook," such that all TCP related requests from any application, and in particular from proxy application 613, are passed to redirector 914. The hook can be implemented as a layered service module within Winsock2. The redirector can pass these requests for TCP services to TCP module 916, to XTP module 956, or to HTTP Engine 920 which may request services from XTP module 956. TCP module 916 and XTP module 956 request services from Raw IP module 950 which in turn communicates with data and link layer module 952. Data and link layer module 952 is responsible for maintaining communication links with remote computers including client computer 610, server computer 618, and remote communication server 626.

Layered communication module 930 includes a compression module 918 for optionally compressing and decompressing data streams passing to and from transport layer modules 940, and a security module 917 for optionally encrypting and decrypting the data streams.

Not shown in FIG. 9 are additional software interface modules on the paths used to pass communication requests from proxy application 613 to redirector 914, from redirector 914 to each of TCP module 916 and XTP module 956, and from HTTP Engine 920 to XTP module 956. These software interface modules accept requests according to the Windows Socket (Winsock) API as specified my Microsoft and pass the requests on to the respective modules. The software interface module on the path joining proxy application 613 and redirector 914 is implemented by the "hook" software interface module introduced above, and is configured to pass only TCP related requests from the proxy application to redirector 914. Requests by proxy application 613 for services involving other protocols than TCP are passed to other software modules which are not shown in the figure. The software interface module on the paths joining redirector 914 to TCP module 916 and to XTP module 956, as well as on the path joining HTTP Engine 920 to XTP module 956 use a Winsock2 module which is a dynamically linked library supplied by Microsoft. Winsock accepts requests according to the Winsock API and makes requests according to the Winsock Service Provider Interface (SPI).

Proxy application 613, as well as other modules using the Winsock API, request communication services in multistep sequences. These steps can include the following types of requests:

A. Request creation of a "socket" using a particular communication protocol, such as TCP or XTP. At any one time, this socket can be used for a single data stream. On successful completion of the request, a "handle" to the socket, an unsigned scalar index, is returned. Further requests related to this socket use the socket handle to identify the socket.

B. Request that an outbound communication channel be established to (connected to) a remote computer. For TCP/IP, the remote host address and port index are specified as the terminating end of the communication channel.

C. Request that an inbound communication channel be established (listened for and accepted) from a remote computer on a particular port. The port may be the port already used for an outbound channel established in a step B above, or may be explicitly specified.

D. Send data on the outbound communication channel.

E. Receive data from the inbound communication channel.

Proxy application 613 makes a series of these communication requests specifying TCP as the communication protocol to be used. These requests are passed to redirector 914. In particular, in order to accept a connection from client computer 610 and then open a connection to server computer 618 on behalf of the client computer, client application 613 executes a series of communication requests including:

1. Create a socket (A) for communicating with client computer 610 using TCP.
2. Listen for and accept an inbound communication channel (C) on a particular port known to the client computer.
3. Request that an outbound communication channels be open (B) to the client computer. The port index at the client computer is the source port of the inbound communication channel.
4. Receive data (E) from the client computer. This data includes the address of server computer 618 with whom the client computer requests to communicate.
5. Create a second socket (A) for communicating using TCP.
6. Connect to server computer 618 (B) using the second socket.
7. Send data (D) (a request) received from client computer 610 to server computer 618.
8. Listen for an inbound channel (C) from server computer 618 on the port used for the outbound communication with the server computer.

9. Receive data (E) using the second socket from the server computer.
10. Send the received data (D) using the first socket to client computer 610.

Proxy application 613 makes the same of Winsock API requests regardless of whether a server computer is at a specially configured server site or a normally configured server site. The proxy application is not aware at the point of making the request whether a communication path through a remote communication server can be established, nor is it aware after communication has been established whether a direct TCP connection has been made to a server computer or whether an XTP connection has been made to a remote communication server.

At the application layer, when client application 611 communicates with server application 619 using HTTP, client application 611 creates an outbound data stream and receives an inbound data stream according to the HTTP protocol. When client application 611 sends HTTP data to proxy application 613, the proxy application requests that the data be written to an open socket but does not otherwise interpret it. Proxy application 613 makes the same request to write HTTP data regardless of whether it is communicating with a specially configured server site or a normally configured server site. The proxy application is not aware whether the HTTP data will be sent to server computer 618 over a TCP connection, sent first to remote communication server 626 using the modified HTTP protocol and XTP protocol, or handled on the gateway computer without requiring communication with any other computer.

In the sequence of requests executed by proxy application 613 enumerated above, redirector 914 passes all the requests related to first socket, which is used to communicate with client computer 610, to TCP module 916. Communication between proxy application 613 and server application 619, hosted on server computer 618, over a direct path between gateway computer 612 and server computer 618 passes through redirector 914, TCP Module 916, and finally Raw IP module 950 and data and link layer module 952. Communication between proxy application 613 and a remote communication server passes through redirector 914, may pass through HTTP Engine 920, passes through XTP module 956, Raw IP module 950 and finally data and link layer module 952. XTP module 956 implements a similar level of functionality as TCP module 916 using XTP as the transport layer protocol rather than TCP. HTTP engine 920 interprets data streams passing through it and implements the client end of the modified HTTP protocol used on the communication segment between gateway computer 612 and remote communication server 626.

In order to determine whether an indirect communication path to a server computer can be established through a remote communication server, a protocol selector 923 in redirector 914 uses information obtained from central database 645 on directory server 640. This information is used to determine if a suitable remote communication server is available and if so, the address of that remote communication server. The host name or network address of directory server 640 is preconfigured in proxy application 613.

Rather than accessing central database 645 whenever it needs to establish a communication path to a server application, redirector 914 maintains server tables 924 that reflect some of the information in central database 645. A first table, "in_table" 926, includes a subset of the entries in central database 645. If an entry is found in this table, the central database does not have to be queried since the information in central database 645 is available locally. A second table, "out_table" 928, includes addresses of server applications known to not have entries in central database 645. If a server application does not have an entry, that server application is accessed using a direct communication path between the gateway computer and a server computer. If a server address is found in out_table, there is no reason to query directory server 640 since it is known locally at gateway computer 612 that no entry will typically be found. These two tables are updated based on information in central database 645. A user interface application 912 is also coupled to server tables 924 to allow a user to view and modify information in the tables.

TCP module 916 receives calls from redirector 914 to open and communicate using the TCP protocols. TCP module 916 receives requests from redirector 914 using the Winsock SPI. When the TCP module 916 receives a request from redirector 914, the redirector is essentially transparent. A call to the TCP module is essentially identical to the call that would have occurred in a typical installation of Windows 95 or Windows NT in which all TCP requests are passed directly to the TCP module rather than to redirector 914.

TCP module 916 maintains socket data 931 which is used to store information about sockets it creates on behalf of applications such as proxy application 613. The socket data is used, for instance, to map a socket handle with an open data connection to a local port index and a remote host address and port index. In addition, TCP module 916 includes data buffers 933 for connected inbound and outbound channels, and receiver and transmitter modules 936, 948 used to implement the TCP protocol independently for each inbound or outbound connection. TCP module 916 communicates with Raw IP module 950, which implements the IP protocol layer, and which in turn communicates with a link and physical layer module 952. The link and physical layer modules is responsible for the communicating over the physical connections including those to client computer 610 and to router 615 at POP 614.

In addition to forwarding requests to TCP module 916, redirector 914 can also forward requests received from proxy application 613 to XTP module 956 and to HTTP Engine 920. Redirector 914 passes to XTP module 956 requests to open communication channels to and communicate with specially-configured server sites in the case that the data stream on that channel does not necessarily use the HTTP application layer protocol. Redirector 914 uses HTTP Engine 920 for HTTP based connections to specially configured server sites. Along with a TCP request, redirector 914 provides HTTP Engine 920 the TCP socket handle used by the client application and the address of a remote communication server that will receive the XTP communication.

XTP module 956 implements the XTP protocol. Logical data streams associated with XTP sockets are associated with XTP contexts. The logical structure of the XTP module is very similar to that of TCP module 916 except that all logical data streams to or from a particular host are multiplexed into a single data stream communicated using the XTP protocol whereas in the TCP module, each logical stream uses a separate instance of the TCP protocol. XTP module 956 includes data buffers 965 for connected inbound and outbound channels, and receiver and transmitter modules 966, 976 used to implement the XTP protocol for each multiplexed data stream to a remote computer. XTP module 956 communicates with Raw IP module 950, which implements the IP network protocol layer, and which in turn communicates with a link and physical layer module 952. The link and physical layer module is responsible for the communicating over the physical connections including those to client computer 610 and to router 615 at POP 614. XTP module 956 maintains socket data 957 which is used to store information related to sockets created by the XTP module. Communication for multiple sockets between gateway computer 612 and a remote computer is multiplexed and demultiplexed by receiver and transmitter modules 966, 976 in XTP module 956 into a single inbound and a single inbound data stream and uses a single instance of the XTP protocol for each such stream. Socket data 957 is used to associate a socket handle with the local and remote port indices, as well as a key associated with the data stream associated with the socket. XTP module 956 includes a rate control module 977 for negotiating the data rate and then limiting the data rate to server systems.

An XTP based communication path between gateway computer 612 and a remote communication server is maintained for a period of time after all contexts are closed. If the client application tries to open a new connection to the remote communication server during this period, the connection is open with very little overhead. The period of time the connection persists, the "keep-alive time," can be a fixed interval or can be determined adaptively based on past communication characteristics.

Redirector 914 can also send a request to HTTP Engine 920 if it determines that a TCP request received from proxy application 613 corresponds to HTTP-based communication to a specially-configured server site. HTTP Engine 920 interprets the application layer HTTP protocol used on a data connection. The HTTP Engine performs two functions in addition direct translation of TCP requests into XTP requests. First, the information in multiple HTTP data streams passing between the gateway computer and a particular remote communication server are multiplexed in HTTP multiplexor 982 for communicating using a single XTP context. Second, the HTTP Engine maintains prefetch buffers 984 which are used to service some HTTP requests for data. The HTTP multiplexor fills the prefetch buffers with data that has not yet been requested and provides the buffered data when a request can be satisfied with that data.

Redirector 914 maintains two additional data structures used in redirecting requests from proxy application 613 to the appropriate communication modules. When proxy application 613 requests creation of a TCP based socket, a TCP socket is indeed created for the proxy application and its handle is returned to the proxy application. At later point when proxy application 613 requests connection to a particular server computer, a second XTP based socket may be created at the request of redirector 914 if indirect communication with the server computer through a remote communication server is to be established. Redirector 914 maintains socket association table 915 which associates the TCP socket handle known to the proxy application and the XTP socket handle used for communicating with a remote communication server. Socket association table 915 also includes information needed to determine which communication module should handle requests for that socket.

Redirector 914 also includes a tracing buffer 927 used to record (trace) certain requests from proxy application 613 that are passed on to TCP module 916. In particular, after the proxy application requests creation of a TCP socket, other requests related to that socket may be made by the proxy application prior to receiving a request to listen for an inbound connection or to connect to a particular remote computer. It is not until a request to establish a connection is received by redirector 914 that a determination can be made that the communication should use XTP rather than TCP. Therefore, these initial TCP requests are recorded in tracing buffer 927. If redirector 914 determines that an XTP socket should be created and associated with a previously created TCP socket, the recorded requests related to the TCP socket are "replayed" to the XTP socket. In this way, the XTP socket will be initialized such that proxy application cannot recognize that further requests directed to the TCP socket are now redirected to the new XTP socket. Alternatively, prior to determining whether XTP or TCP will be used, the requests can be processed in parallel using both protocols until a determination is made. Redirector 914 opens both a TCP and an XTP socket and sends communication requests to both sockets. Once the protocol is selected, the socket that will not be used further is destroyed.

Figure 10:
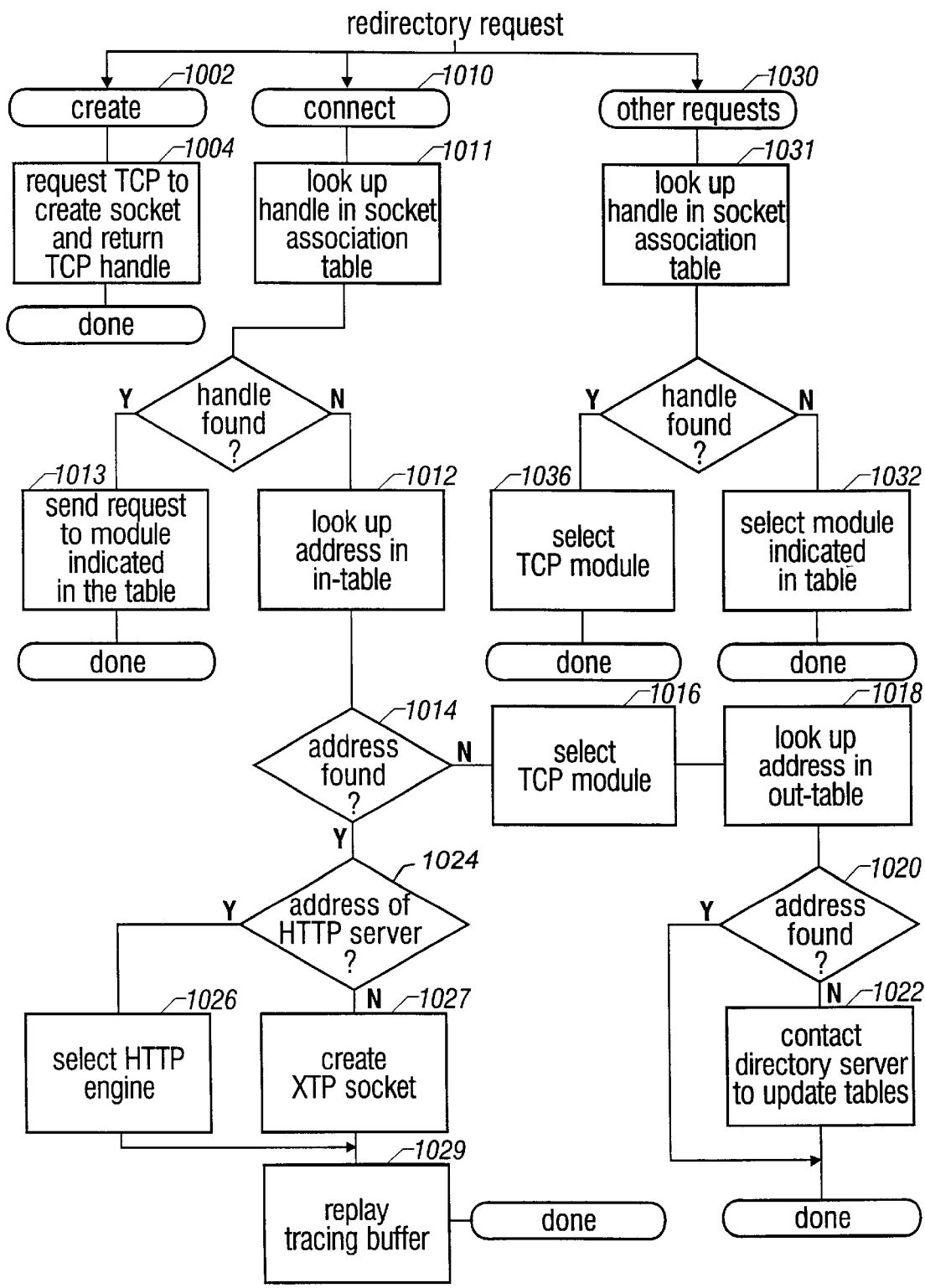
FIG. 10 is a flowchart of the operation of a redirector in response to requests from an application.
Figure 11:
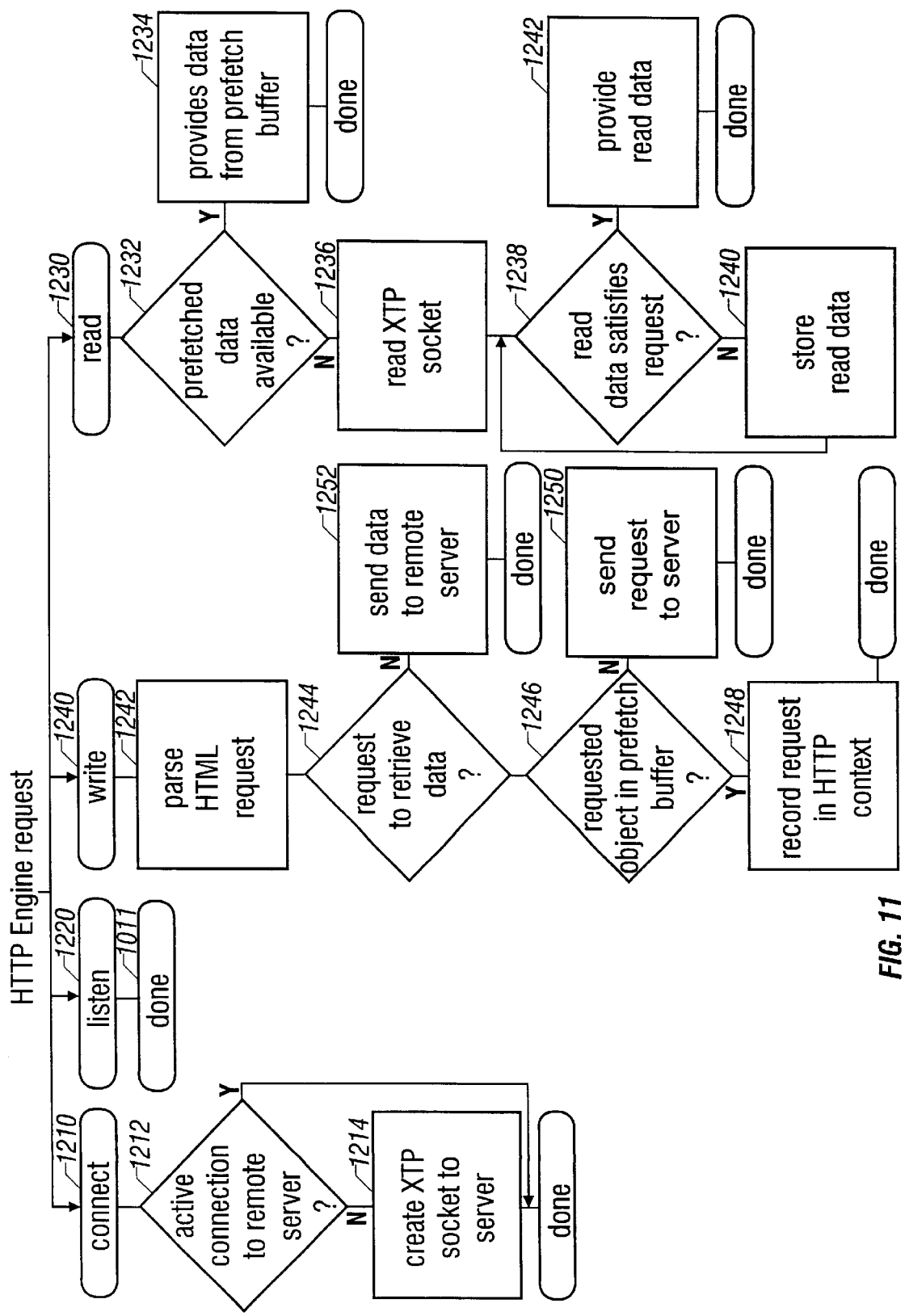
FIG. 11 is a flowchart of the operation of an HTTP Engine in response to requests from a redirector.

FIGS. 10 and 11 illustrate the detailed operation of redirector 914 and HTTP Engine 920. A detailed description of remote communication server 626 of this first embodiment follows the description of module operation in gateway computer 612.

Referring to FIG. 10, redirector 914 responds to a variety of requests proxy application 613. A request to create a TCP socket (1002) is passed to TCP module 916. A socket data handle is created by the TCP module and passed to the proxy application (step 1004).

If the request is to connect (that is, to open for writing) a TCP socket to a remote computer (1010), the redirector first looks up the TCP socket handle in socket association table 915 (step 1011). If an XTP socket handle is associated with the TCP socket handle, the request is passed to the software module handling communication for that TCP socket (step 1013). If the TCP socket handle is not listed in the socket association table, the redirector looks up the host address in in_table 926 (step 1012). The in_table contains the addresses of servers that are known to be served by remote communication servers. If the address is not found (step 1014), then the request is forwarded to the TCP module (step 1016). Separately, either during or some time after the call to the TCP module, the redirector looks up the address in out_table 928 (step 1018). If the address is found (step 1020), then the addressed host is known to not be served by a remote communication server and no more processing is performed. If the address is not found in either the in_table or the out_table, the redirector accesses directory server 640 to update in_table and out_table (step 1022). If the address was found in the in_table (step 1014), then a remote communication server is servicing requests for the addressed host. The next step is to determine whether the addressed port on the addressed host is associated with an HTTP server (step 1024). This information is also stored in in_table along with the remote communication server address. If the connect request is to an HTTP server, a request to create a socket is passed to HTTP Engine 920. The HTTP Engine obtains an XTP socket handle from XTP module 956 and returns the socket handle to redirector 914. The redirector records the socket handle in socket association table 915 with the TCP socket handle used for the request by the proxy application, along with an indication that HTTP Engine 920 is now handling requests for that TCP socket. If the addressed host is not an HTTP server, redirector 914 requests XTP module 956 to create a XTP socket (step 1027) and the TCP socket handle and the new XTP socket handle are recorded in socket association table 915. In the cases that a XTP socket is created by XTP module 956 or indirectly by HTTP Engine 920, requests recorded in tracing buffer 927 are replayed (step 1029) to the software module (XTP module 956 or HTTP Engine 920) now handling communication for the socket.

If the redirector receives a request other than one to create or connect a socket (1030) the redirector first looks up the TCP socket handle in socket association table 915 (step 1031). If an XTP socket handle is associated with the TCP socket handle, the request is passed to the software module handling communication for that TCP socket (step 1032) otherwise the request is sent to the TCP module (step 1034). Note that communication between proxy application 613 and client application 611 is established by the proxy application issuing a listen request using a TCP socket that the proxy application has associated with (bound to) a predefined port. This listen is passed to TCP module 916 according to step 1036.

Referring to FIG. 11, when HTTP Engine 920 receives a request to create an XTP socket to a remote communication server in order to service requests for a TCP socket to communicate with a server computer (step 1210), the HTTP Engine may use an already open XTP connection and multiplex communication for the TCP socket on the open connection. If there is no active XTP connection to the remote communication server (step 1212), HTTP Engine 920 requests creation of an XTP socket and connects to the remote communication server (step 1214). When the HTTP Engine receives a write request (step 1240), it parses the HTTP content of the request (step 1242). If the request is to retrieve a remote object from the server (step 1244), the HTTP Engine first checks to see if the object is already in prefetch buffers 984 (step 1246). If it is, the HTTP Engine records the association of the TCP socket handle and the object requested (step 1248) so that subsequent listen and read requests can retrieve the appropriate buffered data. If the object is not buffered, the request is forwarded over the multiplexed data stream to the remote communication server (step 1250). If the write was not a request for an object (step 1244) the data is sent to the remote communication server (step 1252). When the HTTP Engine receives a request to listen on a connection that previously was used to send or record a request (step 1220), no further processing is necessary. When the HTTP Engine receives a request to read (step 1230), the object previously requested is determined from HTTP context 986. If all or some of the object is in prefetch buffer 984, that data is provided in response to the read request (step 1234). If there is no more data in the prefetch buffer (step 1232), for example if the transfer of the object was initiated before the request from the client, but is still in progress, the HTTP engine requests data from the XTP module using the appropriate XTP socket handle (step 1236). If the received data is for another object (step 1238), that data is stored in prefetch buffer 984 (step 1240), and another XTP read is requested (step 1236). If the received data is for the requested object, the data provided in response to the read request (step 1242).

In related embodiments, redirector 914 can also select a transport layer protocol based on other criteria. For example, a request to open a TCP connection to a port that is associated with a streaming audio server can be handled using a protocol different from TCP or XTP that is well suited to the data being transferred. For example, a protocol with additional forward error correction can be used for streaming audio while a protocol with error control which relies on retransmission can be used for a non-streaming data source. The selection criterion can also be based on knowledge of the content type of the data. The content type can be determined in some cases by monitoring the initial portion of the data transmission.

The description above has concentrated on the functionality at gateway computer 612 which is part of the client communication system. At the server site, remote communication server 626 forms the endpoint of XTP-based communication with the gateway computer. Referring again to FIG. 6, remote communication server 626 acts as a gateway between gateway computer 612 and servers 618, 620. Together, remote communication server 626 and server computers 618, 620 form a single server communication system.

Figure 12:
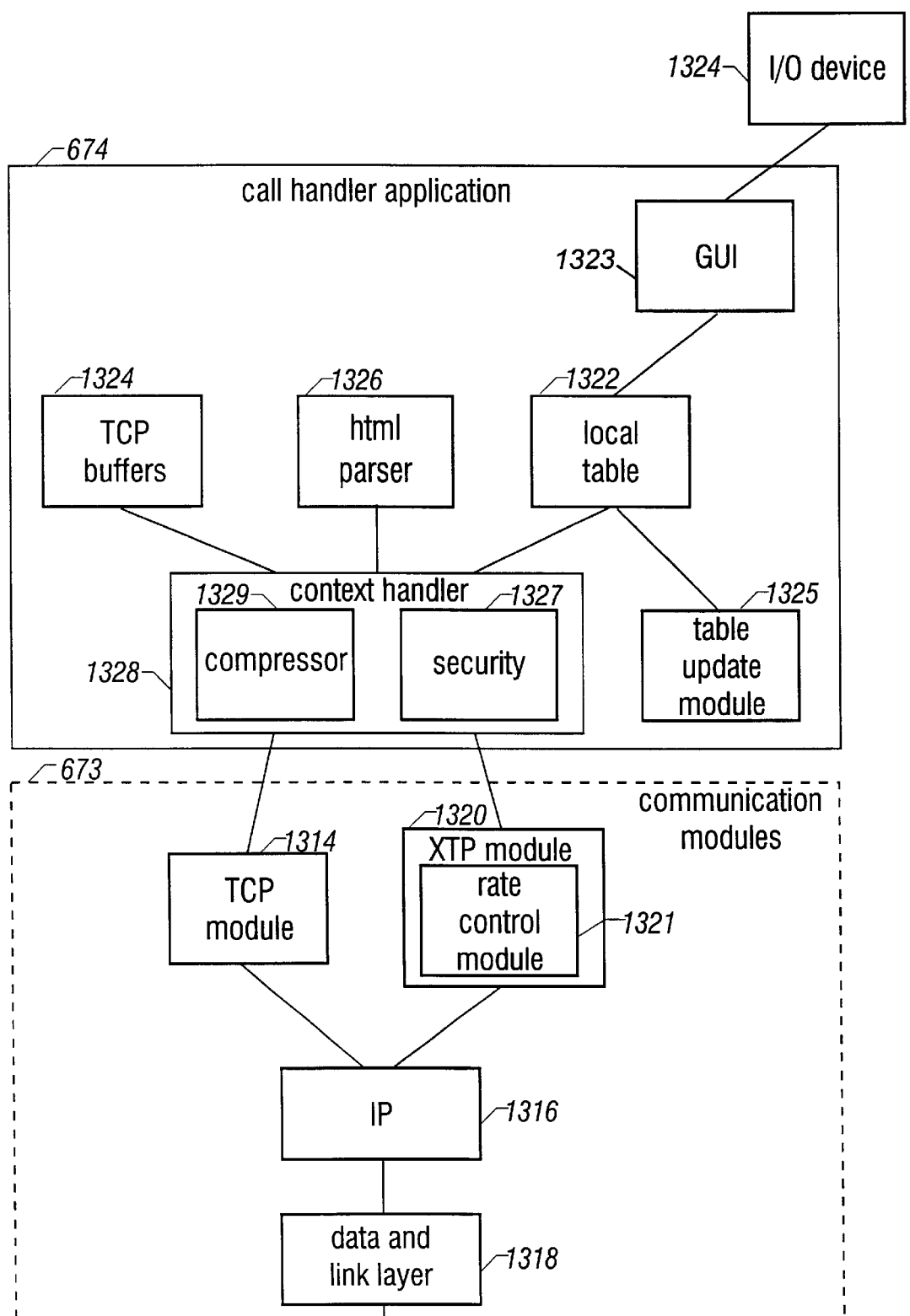
FIG. 12 shows an arrangement of software modules which execute on a remote communication server.

Referring to FIG. 12, call handler application 674 and communication modules 673 execute on a representative remote communication server 626. In the first embodiment, remote communication server 626 is a computer running a Windows NT or Unix based operating system. A standard TCP protocol stack including a TCP module 1314, an IP module 1316, and a link and data layer module 1318 are used to communicate to server computers 618, 620. An XTP module 1320 communicates directly with the IP module. Call handler application 674 communicates with communication modules 673 to handle communication between a gateway computer and server computers. In addition, the HTTP object prefetching function is implemented in call handler application 674.

Call handler application 674 includes a context handler module 1328 which directs communication between gateway computers and server computers, html parser 1326 used to interpret html format data passing from a server computer to a gateway computer, local table 1322 which includes information about server computers served by the remote communication server, and TCP buffers 1324 used to hold data passing between server computers and gateway computers.

Context handler 1328 initially creates an XTP context and makes a listen request of the XTP module to accept a connection from a gateway computer. When a gateway computer connects an XTP context and requests to establish TCP communication with a destination network address, context handler 1328 looks up the destination network address for a server computer in a local table 1322 and, if it finds the destination network address, initiates an execution thread to handle communication with that gateway computer and the server computer. There is typically one execution thread per XTP context. The execution thread opens a TCP channel to the server application. A context thread may open multiple concurrent TCP channels to one or more server computers to handle multiplexed requests from its corresponding gateway computer. When the context handler is notified that a listen on a port has been requested by the client, a TCP listen is requested through TCP module 1314 and begins to read data that it buffers in TCP buffer 1324.

Context handler 1328 can optimally restrict connections between client and server computers. In one instance, context handler 1328 determines whether accepting a connection request from a client system would exceed a total communication capacity for the communication server computer. The communication capacity can be based on a variety of factors including the number of client systems, the number of TCP streams to server computers, or the maximum total data communication rate as calculated by summing the negotiated maximum data rates of all the XTP connections or as calculated by averaging past actual data rates. If the communication capacity would be exceeded by accepting a connection, the connection is refused and the client system must connect to the server computer directly using TCP.

Alternatively, context handler 1328 can restrict connections between client and server computers based on the server computer identified in the communication request from the client computer. For instance, only server computers listed in local table 1322 can be accessed by a client computer. In this way, the remote communication functions as a firewall.

Context handler 1328 is also responsible for the server end of the modified HTTP protocol. As a Web (html format) page is retrieved from a Web server by a context handler through the TCP/IP stack, the page is parsed by html parser 1326. References to objects are extracted. The context handler then makes requests for the objects on servers also served by the remote communication server and forwards the results to the gateway computer which stores them in its prefetch buffer anticipating a request for them from the client application. Context handler 1328 also includes compression module 1329 and security module 1327 for providing compression and encryption services, respectively, for data streams passing between the remote communication server and the gateway computer.

Local table 1322 containing served hosts addresses is periodically communicated to a directory server 640 so that a gateway computer can locate an appropriate remote communication server for a TCP address. A table update module 1325 receives information from server computers to update local table 1322. For instance, the server computers can periodically send broadcast messages that are received by table update module 1325, or the server computers can send a message to the table update module when they are initially configured. Alternatively, the addresses of the server computers can be entered manually through a user interface. Local table 1322 can also be updated manually through a graphical user interface (GUI) 1323 coupled to an input/output device 1324.

XTP module 1320 includes a rate control module 1321. Rate control module 1321 limits the total data rate to each client system rather than limiting the data rate of individual XTP connections. The rate limit for a particular client system is maximum of the negotiated maximum data rates of individual XTP connections to that client system. In this way, even if a client system opens multiple XTP streams, rate control module 1321 avoids exceeding the capacity of data links that may be shared by the multiple streams.

In a variant of the first embodiment, software modules that are hosted on a communication server computer and those hosted on a server computer are hosted together on a single computer. In this variant, communication passing between a call handler application and a server application does not flow across a local network. Instead, data is sent to communication services hosted on the single computer, and passed directly to the destination application by those communication servers.

Figure 9A:
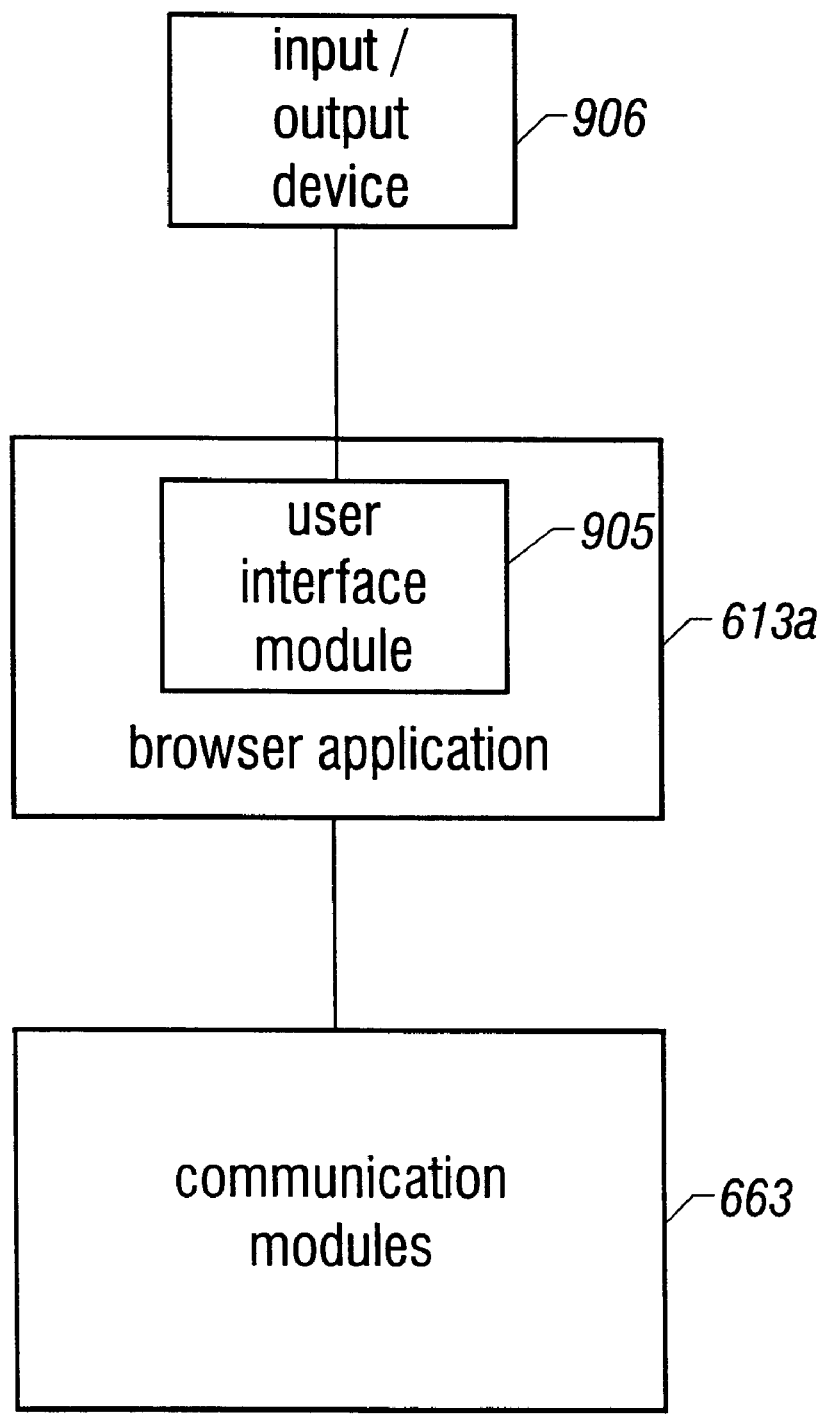
FIG. 9a shows an arrangement of software modules which execute on a client computer.

A second embodiment of the invention implements the same functionality at the server system from the point of view of a client application and the same functionality at the client system from the point of view of a server application as in the first embodiment. However, in the second embodiment, software modules are hosted directly on a client computer or a server computer. In addition, since a gateway computer is not used, no proxy application is needed. The arrangement of software modules on a client computer is shown in FIG. 9a. This arrangement is substantially the same as that shown for a proxy computer as shown in FIG. 9 with the exception that proxy application 613 is replaced with a client application 613a. Client application 613a can be a browser application which includes a user interface module 905 coupled to an input/output device 906 for accepting requests for information from a user and displaying information sent from server computers in response to the requests.

At the server system, in the second embodiment, the functionality of the server computer and the remote communication server are combined on a single computer which uses the Microsoft Windows 95, Windows NT, or Unix operating system. A server application 1412 configured to use TCP and HTTP executes on the server computer.

Figure 13:
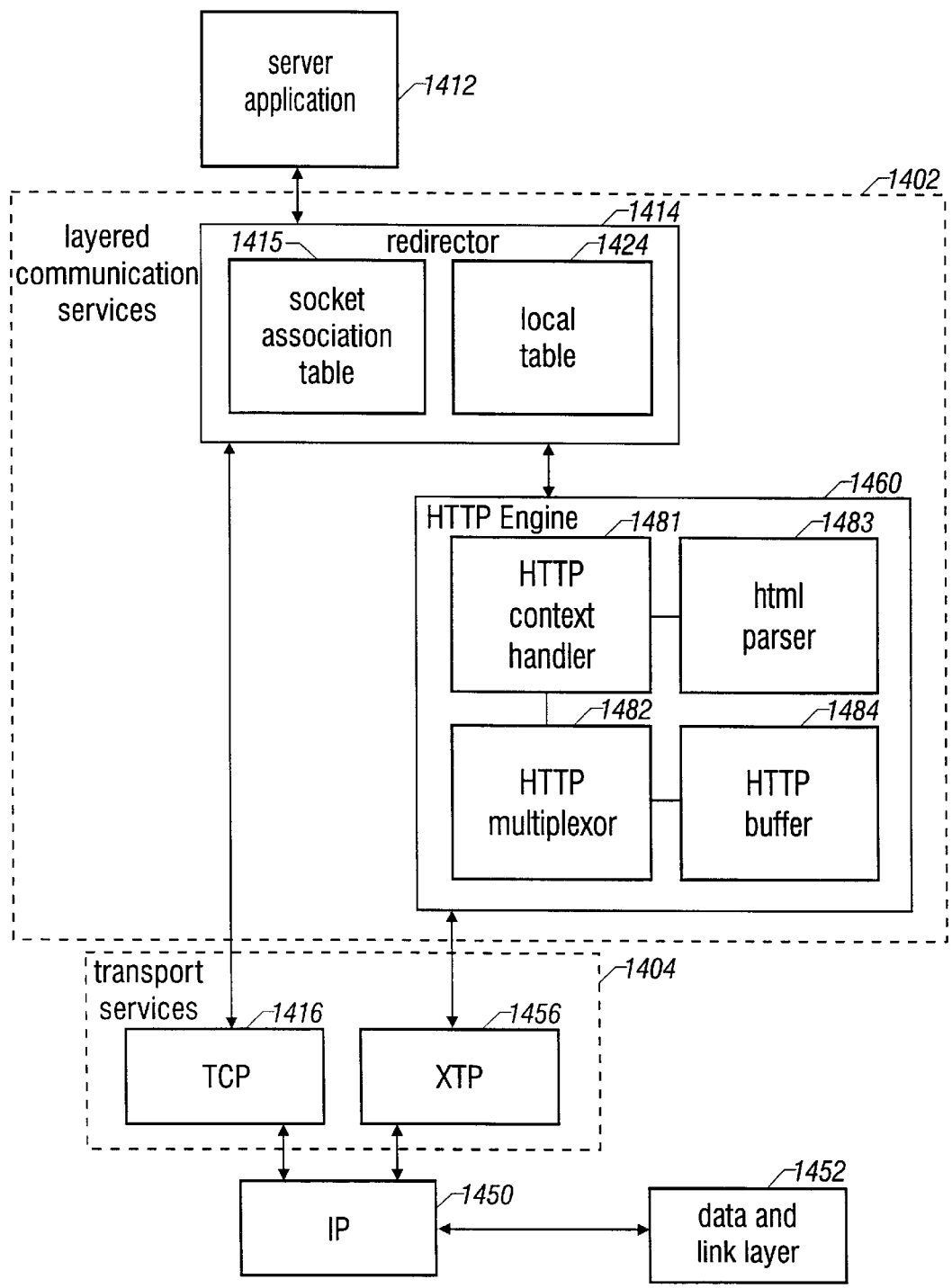
FIG. 13 shows an arrangement of software modules which execute on a server computer which supports communication using both TCP and XTP protocols.

Referring to FIG. 13, the arrangement of software modules is similar to that shown in FIG. 9. Server application 1412 requests TCP services from layered communication services 1402. Redirector 1414 handles the request and communicates with transport services 1404, including TCP module 1416 and XTP module 1456, or HTTP Engine 1460 to handle services requested by server application 1412. Redirector maintains a socket association table 1415 that associates TCP socket handles created for the server application and XTP sockets created by the redirector.

Redirector 1414 initially receives a request from server application 1412 to listen on a predefined port for a TCP connection from a client system. Redirector 1414 determines using local table 1424 whether that port corresponds to a server application for which an XTP-based connection can also be accepted, and if so, it also determines whether the port is a server port for HTTP based communication. Based on this determination, redirector 1414 either forwards a request to listen only TCP module 1416, or in addition requests either XTP module 1456 or HTTP Engine 1460 to also listen for an XTP based connection on an XTP socket. If a connection is received on an XTP-based socket, the association of the TCP socket handle known to the server application and the XTP socket handle known to the redirector is recorded in socket association table 1415.

When redirector 1414 receives any other request using a TCP socket handle, that handle is looked up in socket association table 1415 and if found, the request is forwarded to the module handling that socket (XTP module 1456 or HTTP Engine 1460), otherwise it is sent to TCP module 1416.

When HTTP Engine 1460 receives a request to send information to a client computer, HTTP Engine multiplexes the outbound data using HTTP multiplexor 1482. If the data stream corresponds to an html format Web page, the information in that page is interpreted in html parser 1483 and references to embedded data are recorded by HTTP context handler 1481. If the referenced data is available from server application 1412, HTTP context notes that this data should be prefetched from server application 1412.

When HTTP Engine 1460 receives a request to listen for a connection, that request can be satisfied in three different ways. First, if HTTP context handler 1481 has previously noted that data should be prefetched from server application 1412, a HTTP request is simulated by HTTP context handler 1481 and the listen is satisfied by this simulated request. Second, XTP module 1456 may accept a new XTP socket from a new client computer. Third, HTTP Multiplexor 1482 may satisfy the request using multiplexed communication on a XTP communication channel with a current client computer. HTTP Engine 1460 records the association of the TCP socket handle known to the server application and the source of the data that satisfied the listen request.

When HTTP Engine 1460 receives a request to read data, the read is either satisfied by HTTP context handler 1481 which simulates a HTTP request, or is handled by HTTP multiplexor 1482 depending on how the corresponding listen request was handled. Since multiple data streams may be multiplexed on a single XTP context, the read request handled by HTTP multiplexor 1482 is either satisfied by previously read data in HTTP buffer 1484, or by data read from an inbound XTP socket. Data read but that is not used to satisfy the read request is buffered in HTTP buffer 1484 until data that does satisfy the read request is found on the inbound stream.

Figure 1:
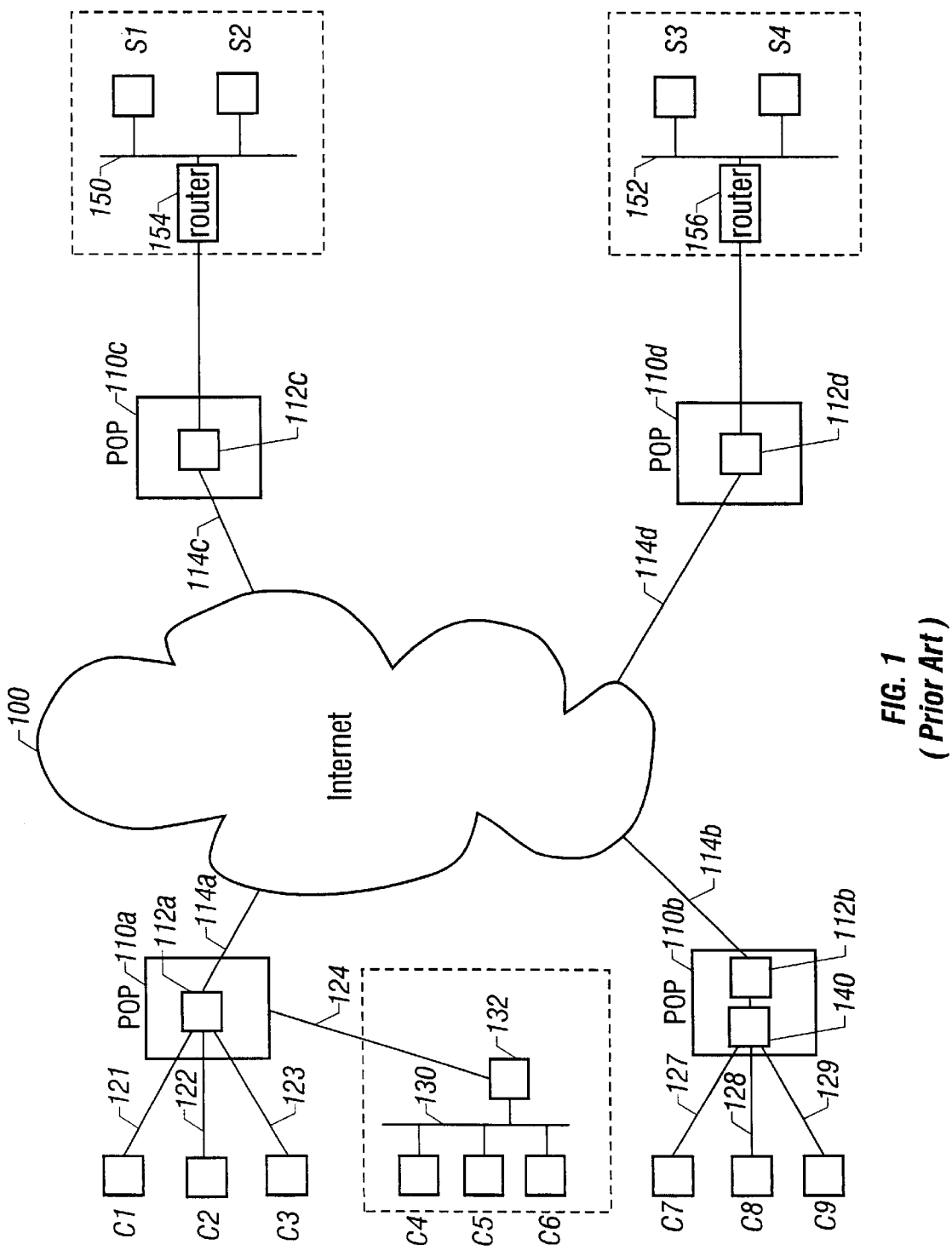
FIG. 1 illustrates typical coupling of client and server computers to the Internet.
Figure 2:
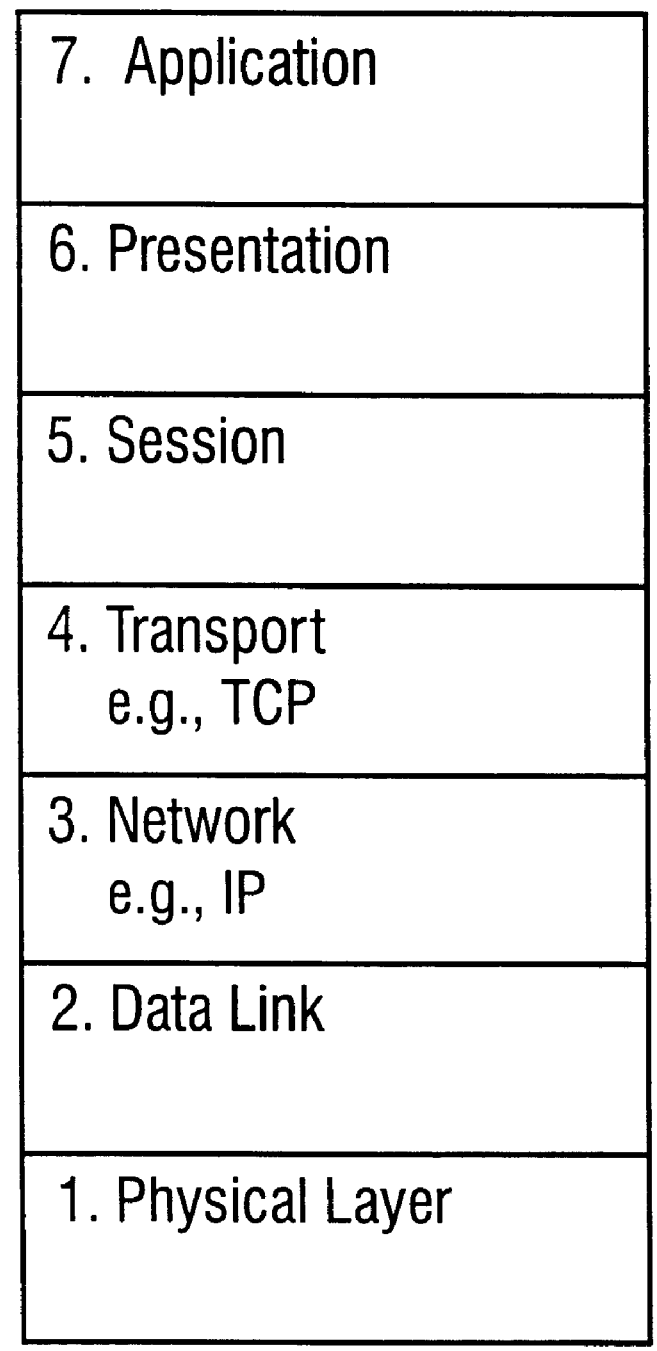
FIG. 2 shows the seven ISO communication protocol layers.

In other embodiments, a various types of client and server communication systems can be used. Some client communication systems can include client computers communicating through a gateway computer while other client computers communicate directly to server communication systems using XTP. Some server communication systems can include one or more remote communication servers while others can use server computers that include the functionality of a remote communication server. In addition, the functionality hosted on a gateway computer in the first embodiment can be hosted on a proxy server at a POP such as proxy server 140 at POP 110b shown in FIG. 1 in which case the client communication system is hosted on computers both at the client site and at the POP. In addition, communication between a client computer and the proxy server can use a variety of protocols, including proprietary protocols that are particular to communication between certain clients and certain proxy servers.

Other embodiments of the invention use alternative methods to determine whether communication between a client computer and a server computer can use an alternative transport layer protocol, and to determine an alternative network address to which a client computer should address such communication using the alternative transport layer protocol. One approach is for the alternative network address to be a known transformation of the network address of the server application itself, for example, a different port index on the same addressed host. In this approach, a gateway computer or a specially enabled client computer tries to make a connection to a remote communication server (which may not exist) and if there is no response, assumes that the server computer is not served by a remote communication server and, instead, proceeds to establish a TCP connection.

Figure 14:
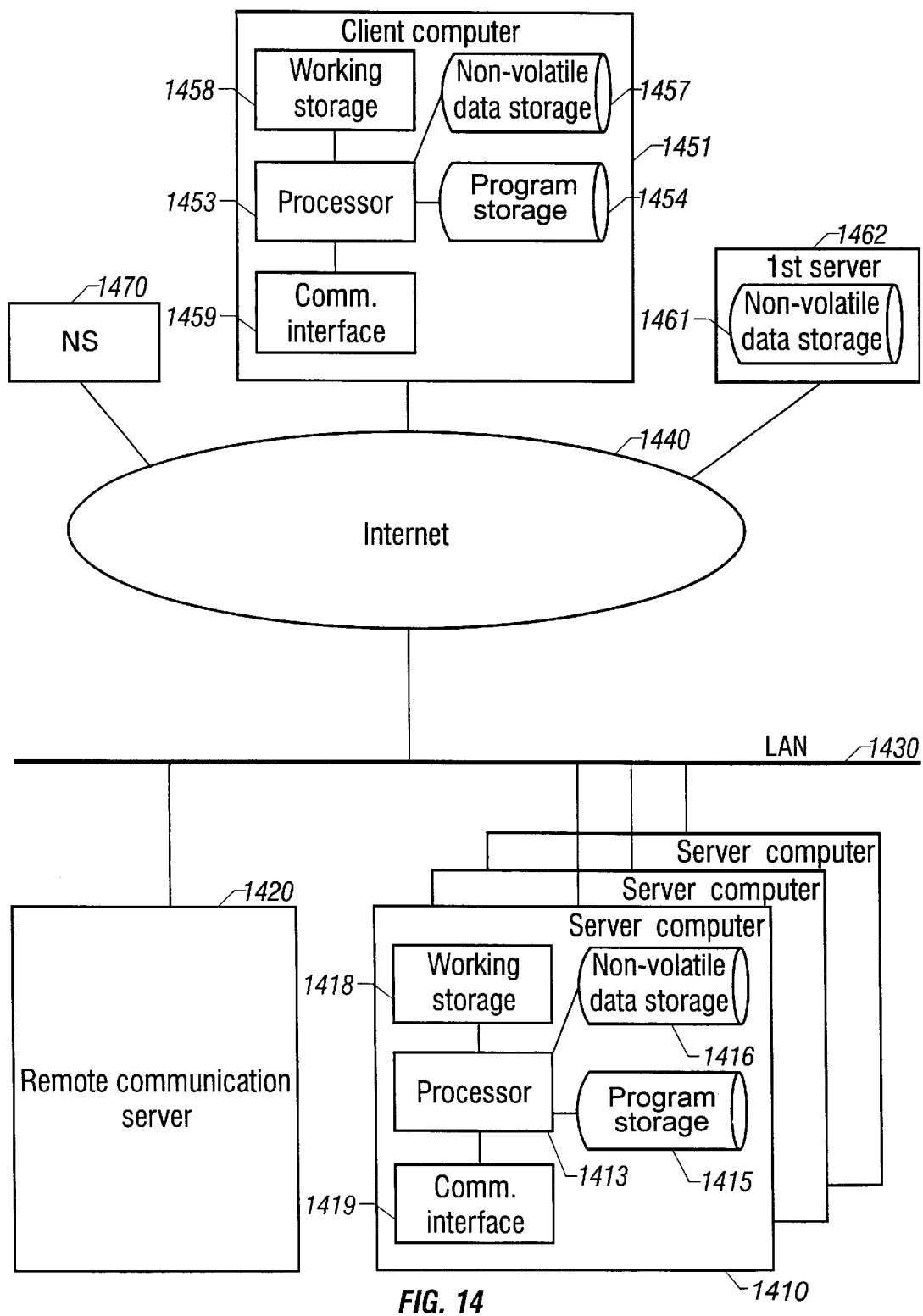
FIG. 14 illustrates a client computer coupled over the Internet to a Domain Name Server, a list server, and a server LAN.

Referring to FIG. 14, a third illustrative embodiment makes use of directory information which is distributed, in part, at server computers themselves. A client computer uses this distributed information to determine whether a server computer can accept communication using an alternative communication protocol at an alternative address. In FIG. 14, server computer 1410 is associated with a remote communication server 1420 which receives communication for server computer 1410 at an alternative address using the alternative communication protocol. Note that in related embodiments, the functionality of remote communication server 1420 and server computer 1410 could be provided by a single computer, and in such embodiments the alternative address is then on the same host as an originally requested TCP address.

Remote communication server 1420 is coupled to one or more server computers 1410 over LAN 1430 which is in turn coupled to a client computer 1451 over Internet 1440. Client computer 1451 includes a processor 1453, non-volatile data storage 1457, such as a magnetic disk, and program storage 1454, such as a fixed or removable disk. A communication interface 1459 couples processor 1453 to Internet 1440. Server computer 1410 similarly has a processor 1413, non-volatile data storage 1416, program storage 1414 and a communication interface. Also coupled to Internet 1440 is a list server 1462, which serves a similar function to the directory servers described in the first and second embodiments. List server 1462 includes a nonvolatile data storage such as a magnetic disk.

Also coupled to Internet 1440 is a domain name service (DNS) 1470 that provides a name resolution service for other computers coupled to it over the Internet. DNS 1470 can accept a host name and provide an IP address associated with that host name. List server 1462, also coupled to Internet 1440, maintains a database including associations of server computers and IP addresses of remote communication servers associated with those server computers. This database is stored on non-volatile storage 1461.

Figure 15:
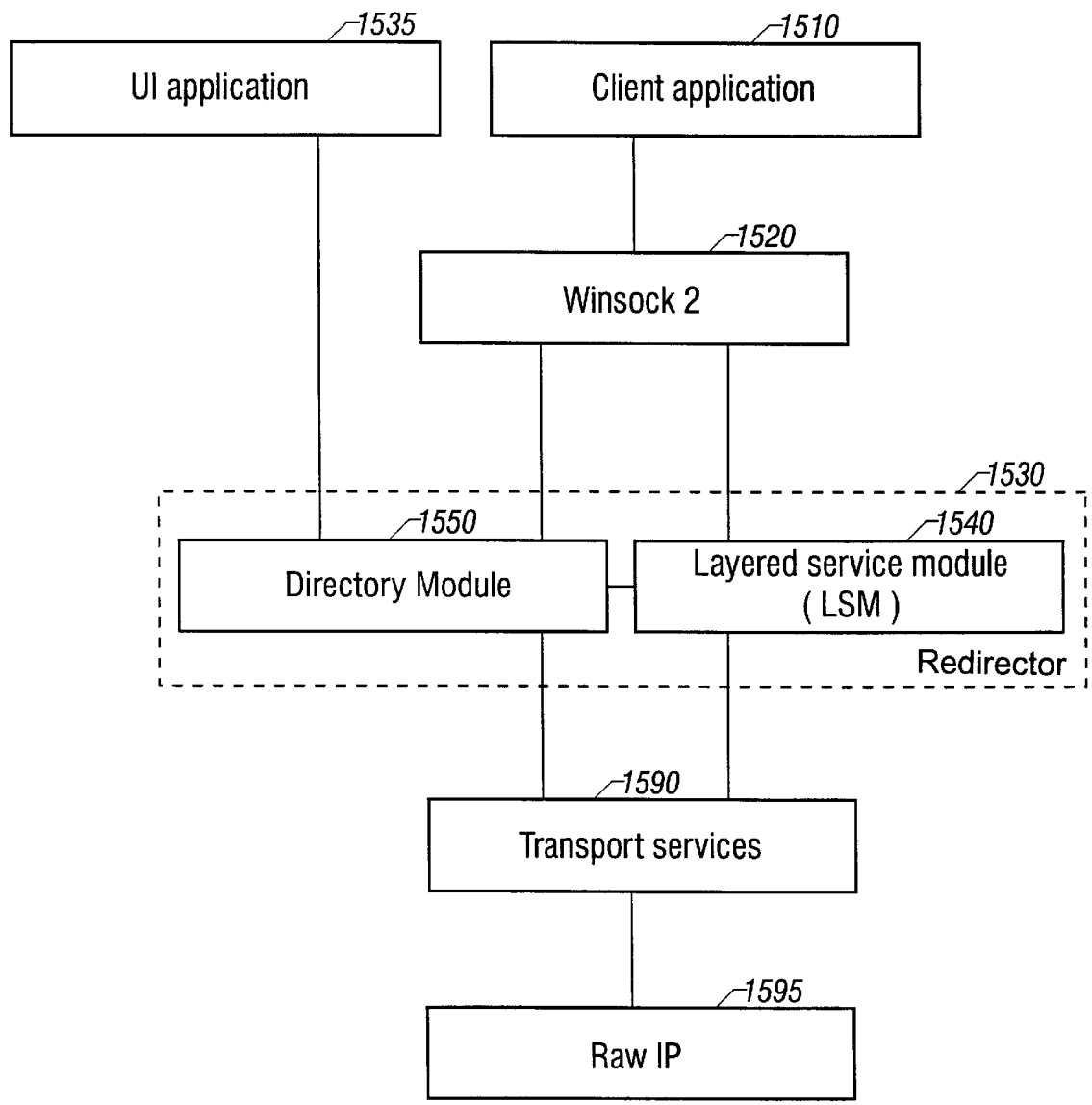
FIG. 15 shows an arrangement of software modules, including a directory module, on a client computer.

Referring to FIG. 15, when a client application 1510, such as a Web browser, executing on client computer 1451 (FIG. 14) attempts to communicate using TCP/IP with an IP address on server computer 1410 (FIG. 14), communication passes through a set of software modules also executing on client computer 1451. FIG. 15 shows an arrangement of software modules for a client computer using the Microsoft Windows95 or Windows NT operating systems.

Client application 1510 communicates with a Winsock2 module 1520 which provides an interface to communication services, including TCP/IP services needed to communicate with remote computers. Winsock2 1520 includes interfaces to name service providers and to transport service providers. A name service provider is a software module that translates host names, in the form of character strings, into a lower-level address that are then used by transport service providers, such as a TCP service provider. A name service provider may rely on services provided by another computer, such as an Internet DNS. A transport service provider is a software module that implements transport layer communication services to allow a client application to communicate with remote applications. In FIG. 15, layered service module (LSM) 1540 provides standard transport protocol services, such as TCP-based transport services, to Winsock2 1520 according to the Microsoft Winsock2 Service Provider Interface (SPI) and therefore behaves as a transport service provider. Directory module 1550 provides IP-based name services to Winsock2 1520. Together, directory module 1550 and layered service module 1540 are part of a redirector 1530 which determines whether an alternative communication protocol can be used on a particular TCP/IP connection request from client application 1510 to a server computer, and provides an interface to transport services 1590 used to pass data to and from that server computer. Raw IP module 1595, in turn provides lower-level services to modules in transport services 1590. Transport services 1590 also provides communication services to directory module 1550. A user interface (UI) application 1535 is also coupled to directory module 1550. UI application 1535 provides an interface to a user of the client computer to access information maintained in directory module 1550, and to update that information.

Figure 16:
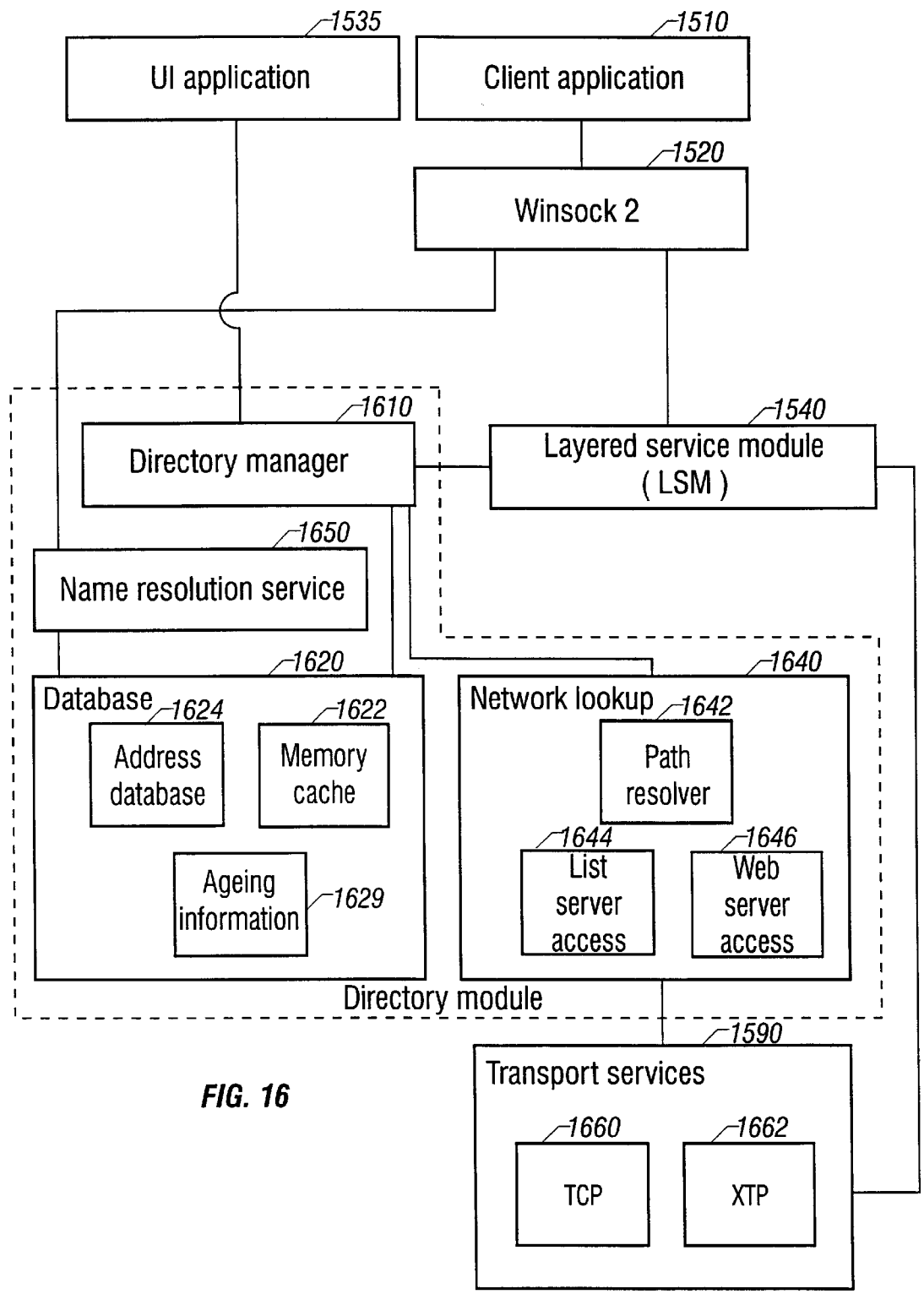
FIG. 16 shows software modules on a client computer, including a detailed view of modules that are part of the directory module.

Referring to FIG. 16, transport services 1590 include TCP module 1660 and XTP module 1662, which provide transport services directly to LSM 1540. As in the previously described embodiments, XTP module 1662 is used to a provide transport layer communication services for enhanced communication between a client application 1510 and a remote server application.

Continuing to refer to FIG. 16, directory module 1550 includes several submodules. A name resolution service 1650 receives name resolution requests from Winsock2 1520 and uses a database 1620 to attempt to resolve those requests. A directory manager 1610 receives requests from LSM 1540 to determine whether a remote communication server is associated with the address of a server computer. Directory manager 1610 uses database 1620 and possibly a network lookup module 1640 in responding to those requests.

Database 1620 includes an address database 1624 which includes associations of server host names, server IP addresses, and IP address of remote communication servers, if any, associated with those server hosts. Address database 1624 also includes additional information particular to specific server sites. Address database 1624 is maintained on non-volatile data storage 1457 (FIG. 14) using multiple files. In addition, database 1620 includes a memory cache 1622, stored in volatile working storage 1458 (FIG. 14), used to maintain copies of portions of the database for rapid access. Database 1620 also includes ageing information 1629 which is used to record information related to data access and is used to delete data, for example, data that was least recently accessed or has been least frequently accessed, in order to free space on working storage 1458 or non-volatile storage 1457.

Figure 17A:
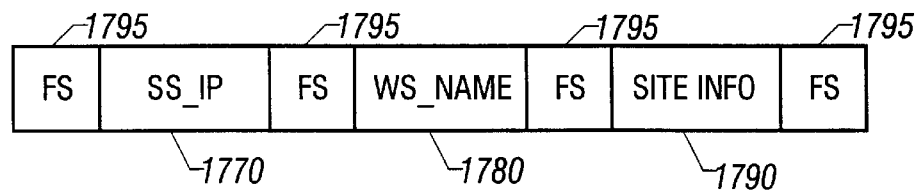
FIG. 17a shows the format of a database record for a server computer.

Address database 1624 is stored on non-volatile storage 1457 using a separate binary file for each server computer. Referring to FIG. 17a, for a particular server, the file contains binary fields delimited by field separators 1795. The fields in a record include the IP address of a remote communication server (SS__IP) 1770, and a name entry for the server computer (WS__NAME) 1780. The record also includes site-specific information (SITE__INFO) 1790. Each of the individual files of address database 1624 are stored in a single directory, and have file names derived from the IP address of the server computer (WS__IP). In particular, the WS__IP field is interpreted as a unsigned 32-bit number, and expressed in base 36 using the symbols 0–9 and A–Z. A common prefix, for example "SN", and a common extension, for example, ".SSF", is used for all the files. For example, the IP address "199.103.141.58" is associated with the file name "SNG8V2RR.SSF".

Referring again to FIG. 16, directory manager 1610 makes use of network lookup module 1640 to access distributed directory information that it uses to determine whether a remote communication server is associated with the address of a server computer. If, in response to a request from LSM 1540, directory manager 1610 cannot satisfy a request for remote communication server information using database 1620 alone, the directory manager issues a request to network lookup 1640. Network lookup 1640 uses path resolver 1642 and web server access 1646 modules, which in turn uses transport services 1590, to attempt to retrieve the needed information from the server computer itself. If successful, network lookup 1640 provides the retrieved remote communication server information to directory manager 1610, which then both updates database 1620 and provides a response to LSM 1540.

UI application 1535 is also coupled to directory manager 1610. UI application 1535 provides an interface for a user of the client computer to access information in database 1620, and to update that information. A user may update information in database 1620 by explicitly providing that information to UI application 1535. For example, a user may know the address of a remote communication server associated with a particular server computer. The user may also know information needed to establish a connection to the remote communication server, such as a password, that he provides to the UI application for storage in database 1620.

Rather than explicitly providing information for database 1620, the user can also request that information be obtained from a server computer 1410 or from a list server computer 1462 (FIG. 14). UI application 1535 requests from directory manager 1610 that a particular server computer or list server, or a default list server known to directory manager 1610, be accessed to obtain information to be stored in database 1620. An explicit location on the list server may be provided by UI application 1535, or a default location known to directory manager 1610 may be used. Directory manager 1610 passes the request to path resolver 1642, which uses list server access module 1644 to retrieve the information from a list server, or which uses web server access 1646 module to retrieve the information from a server computer. The information is passed back to directory manager 1610 which uses the information to populate database 1620.

The user may also use UI application 1535 to access information in database 1620. For example, site descriptions of server computers, lists of server computers in a particular category, or other information about the servers can be displayed. This information may be used by the user to select a particular server computer.

Network lookup 1640 accesses data on a server computer, or on a list server, by retrieving a data file from that computer. Web server access 1646 uses a predetermined pathname for the data file on the server computer. The data file is known as a "site file." The file is kept in a secret directory that is not normally accessible to remote users. In this embodiment, the pathname is of the form "<WEBROOT>/<DIRNAME>/<FILENAME>.dat", for example "<WEBROOT>/. sitara/sitara.dat", where "<WEBROOT>" is the pathname of the root directory accessed by a Web server. List server access 1644 by default uses the same file name when retrieving information, although an explicit path name may be provided by the user through UI application 1535.

Figure 17B:
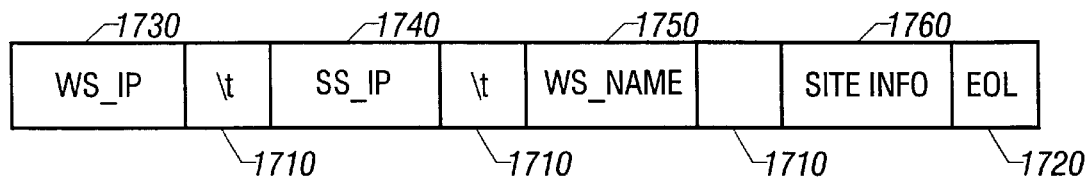
FIG. 17b shows the format of a record in a site file.

A site file includes information used to populate database 1620. In this embodiment, the site file is a text file. Referring to FIG. 17b, the site file has one or more lines as shown. Each line, associated with a particular server computer, contains tab delimiters 1710 separating the IP address of the server computer (WS__IP) 1730, the IP address of a remote communication server (SS__IP) 1740, which is a null entry if there is no remote communication server associated with the server computer, and a name entry for the server computer (WS__NAME) 1750. The record also includes site-specific information (SITE__INFO) 1760, and is terminated by a newline 1720. A site file, both on a server computer and on a list server, may have multiple lines corresponding to multiple associations of server computers with remote communication servers.

Operation of various software modules is illustrated in the flowcharts in FIGS. 18–22. In the following description of the flowcharts, unless otherwise indicated in parentheses, elements involved in the steps appear in FIG. 16. A request by client application 1510 to Winsock2 1520 to connect a TCP socket (communication channel) to the server computer is handled in several steps.

Figure 18:
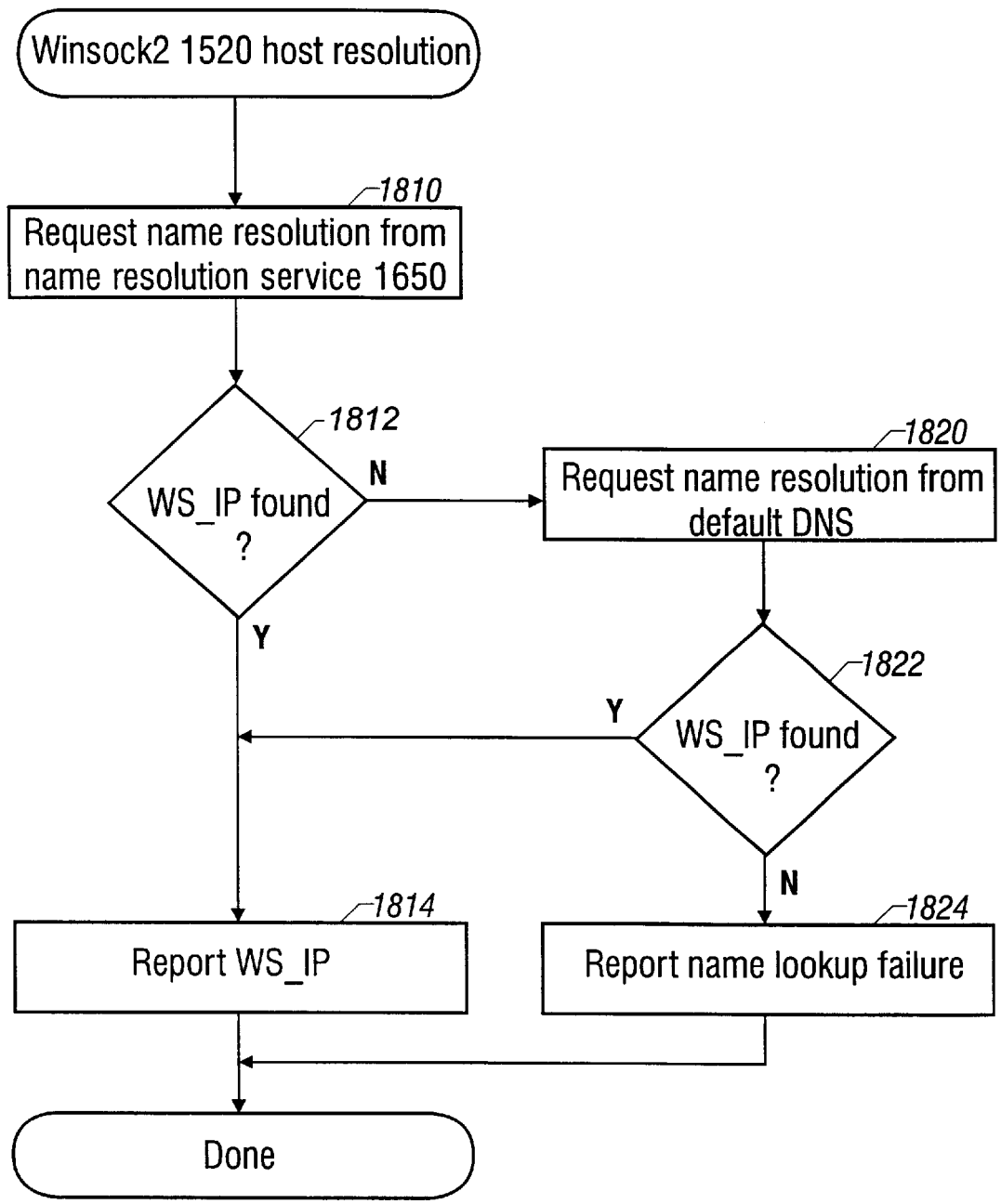
FIG. 18 is a flowchart of a host name resolution.

Referring to FIG. 18, after client application 1510 provides the name of the server computer in the form of a character string, Winsock2 1520 determines an IP address associated with this host name. Winsock2 1520 later passes that IP address to transport services that actually connect the communication channel. In determining the IP address, Winsock2 1520 first requests resolution of the server host name from name resolution module 1650 (step 1810). If name resolution module 1650 cannot find an IP address for the host (step 1812), Winsock2 1520 requests resolution of the host name from a default name service provider (step 1920) which accesses DNS 1470 (FIG. 14) to resolve the server host name. If name resolution module 1650 cannot provide the IP address (step 1812) and DNS 1470 cannot provide an IP address for the server host (step 1822), Winsock2 1520 reports a name lookup failure to client application 1510 (step 1824).

Assuming that Winsock2 1520 successfully resolves the server host name, using either name resolution service 1650 or DNS 1470, it then requests that LSM 1540 connect the socket to the IP address of the server computer (WS_IP).

Figure 19:
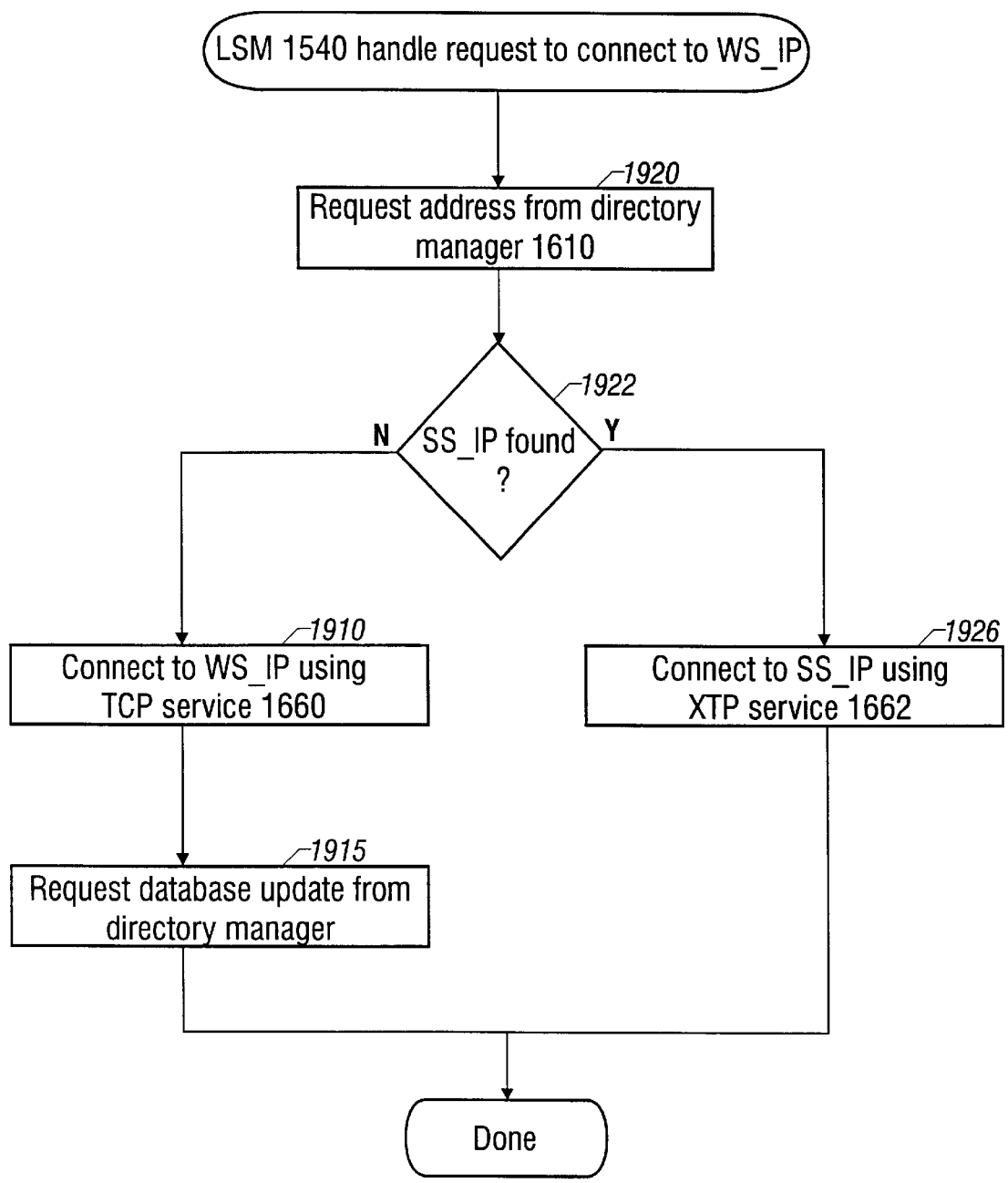
FIG. 19 is a flowchart of a layered service module handling a request to connect to a server computer.

Referring to FIG. 19, LSM 1540 receives a request to connect to a server at address WS_IP. LSM 1540 requests from directory manager 1610 the address of a remote communication server associated with the server computer's IP address (step 1920). Directory manager 1610 accesses database 1620 by first searching memory cache 1622 and, if no record is found, searching address database 1624. If it finds a record for the server computer, it returns the value of the SS_IP field, which is the address of a remote communication server for the server computer. If the record was found in address database 1624, directory manger 1610 stores a copy of the record in memory cache 1622. If there is no record for the server computer in database 1620, directory manager 1610 returns a null address. If directory manager 1610 returns a null remote communication server address (step 1922), LSM 1540 attempts to connect to the server computer directly using TCP (step 1910). If directory manager 1610 returns the address of a communication server, LSM 1540 connects to the remote communication server using the appropriate enhanced communication protocol (step 1926). In particular, the enhanced protocol involves communication using XTP module 1662 in a manner presented above in the descriptions of the first and second embodiments. If LSM 1540 connects to the server computer using TCP (step 1910), it subsequently issues a request to directory manager 1610 to update its entry for that server computer (step 1915).

Figure 20:
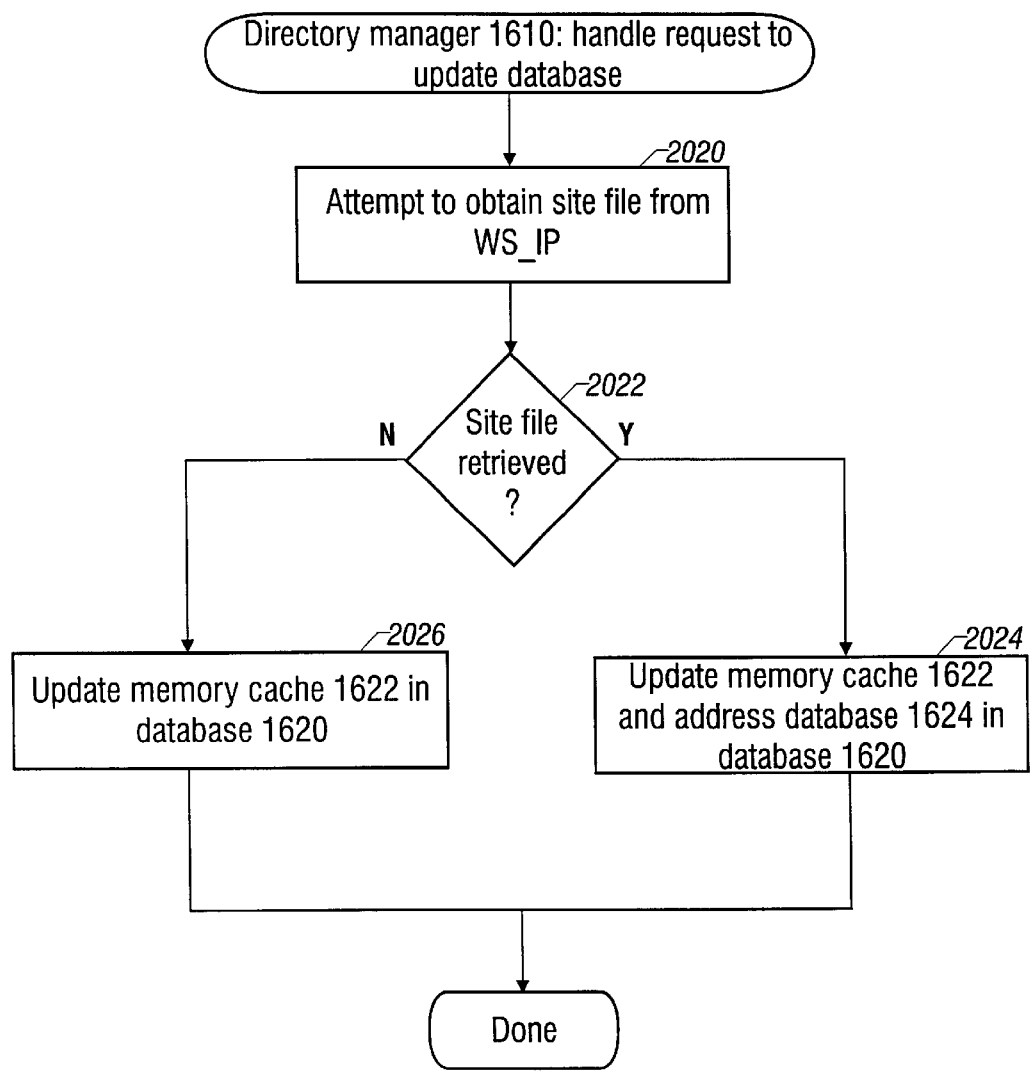
FIG. 20 is a flowchart of a directory manager handling a request for a remote communication server address.

Referring to the flowchart of FIG. 20, when LSM 1540 requests from directory manager 1610 that it update the entry for a server computer, directory manager 1610 first determines whether a record for the server computer is stored in database 1620 (step 2010). If there is a record, directory manager 1610 does not need to perform any further update. If directory manager 1610 determines that there is no record in address database 1620 associated with the server IP address (step 2010), it attempts to obtain a site file from the server computer (step 2020). Directory manager 1610 requests the site file information from network lookup 1640 (FIG. 16) which accesses the site file from the server computer at address WS_IP, in this embodiment, using the HTTP protocol. If network lookup 1640 successfully returns the information in the site file (step 2022), directory manager 1610 updates both memory cache 1622 and address database 1624 of database 1610 (step 2024). If the site file is not successfully retrieved (step 2022), for instance because the server computer is not associated with a remote communication server in which case the server computer returns a "file not found" message when the client computer requests the site file, directory manager 1610 updates memory cache 1622 (but not address database 1624) of database 1620 by creating a record for the server computer, and storing a null in the field for the remote communication server address associated with the server address (step 2026). Note that memory cache 1622 is deleted when client application 1510 exits, and therefore a record which indicates that a server computer is not associated with a remote communication server persists only as long as the application that accessed the server computer is active.

A fourth embodiment extends the functionality of the third embodiment, described above, to include loadable software modules for use in communication with particular remote communication servers. Referring back to FIG. 17, the SITE_INFO field of a record of database 1620 can now include a reference to a loadable software module that is required for communicating with the remote communication server at address SS_IP. A reference includes a URL of the software module. Directory manager 1610 is responsible for retrieving and keeping the software module up to date. LSM 1540 is responsible for dynamically loading the module, and for branching to available entry points in the module at appropriate times while communicating with the remote communication server. A loadable module is kept up to date using a trigger mechanism. Specifically, for each loadable module that has previously been retrieved, directory manager 1610 maintains records the latest date the module was retrieved or that it checked to determine whether a newer version was available. Each loadable module is also associated with a maximum interval that the module can be used before directory manager 1610 must check that a newer version is available. If more than the maximum interval for a module has elapsed since the module was loaded or a check was made, directory manager 1610 checks whether a newer version is available, and if one is available, the newer version is retrieved by directory manager 1610 and loaded by LSM 1540 without the necessity of user intervention.

Figure 21:
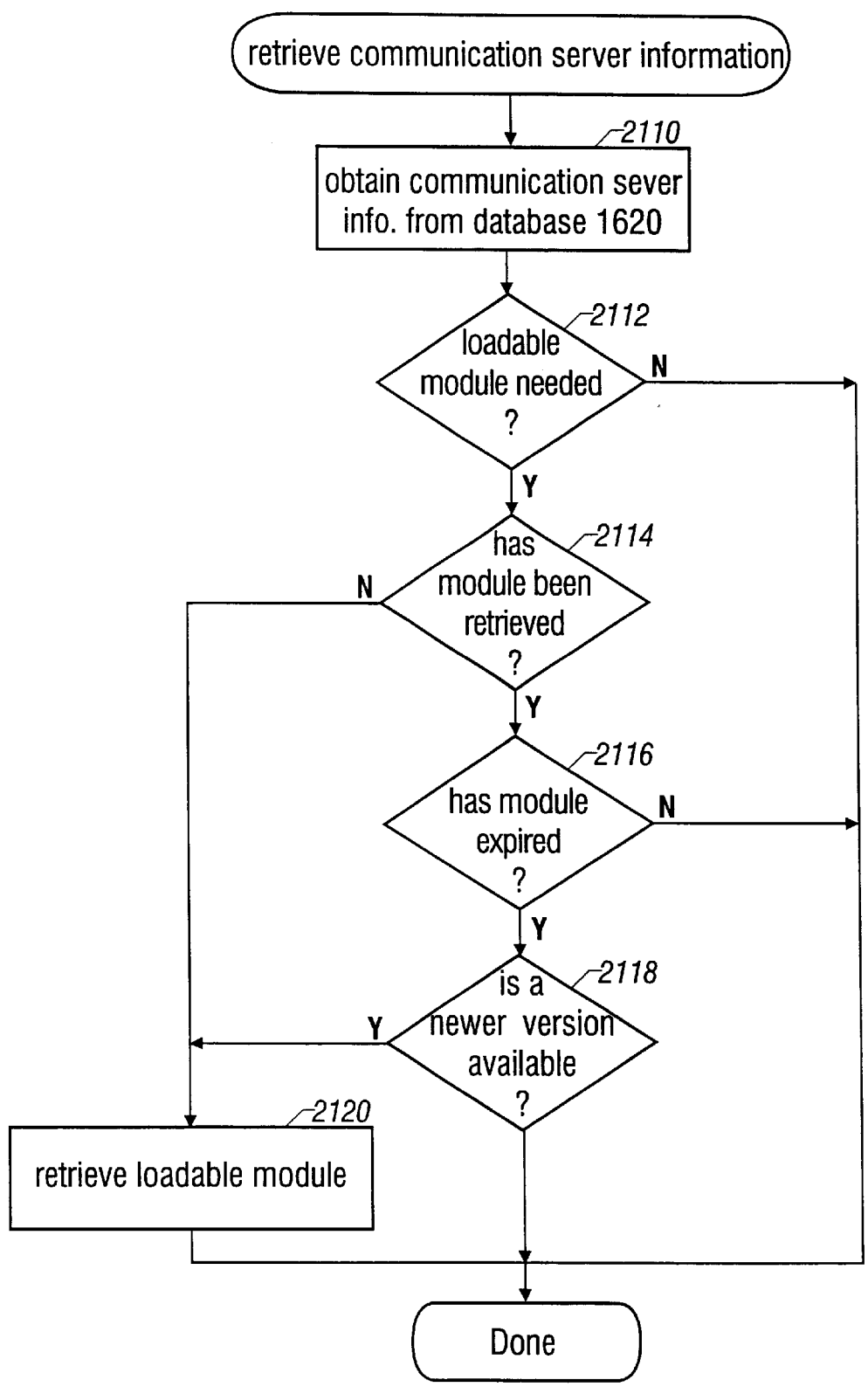
FIG. 21 is a flowchart of a directory manager retrieving remote communication server information and loadable modules.

Referring to FIG. 21, after directory manager 1610 retrieves a record from database 1610, or from a newly retrieved site file, (step 2110), directory manager 1610 determines from the SITE_INFO field whether a loadable module is required for communication with the indicated remote communication server (step 2112). If a loadable modules is not needed, the remote communication server IP address is returned to LSM 1540 as in the third embodiment. If a loadable modules is required (step 2112), then directory manager 1610 determines whether it is currently storing a local copy of the required module (step 2114). If not, the directory manager retrieves the module (step 2120) and stores it in a local file. The IP address of the remote communication server and the pathname of a local copy of the retrieved module are returned to LSM 1540. If the module has been previously retrieved (step 2114), then it may have already expired. Expiration is checked (step 2116), and if it the module has not expired, then the IP address of the communication server and the local pathname of the loadable module are passed to LSM 1540. If, on the other hand, the module has expired (step 2116), directory manager 1610 checks whether a newer version is available by accessing the date of the version at the referenced location over the Internet (step 2118). If a newer version is available, that version is retrieved and stored in a local file (step 2120). The IP address of the communication server and the local pathname of the loadable software module are then passed to LSM 1540.

Figure 22:
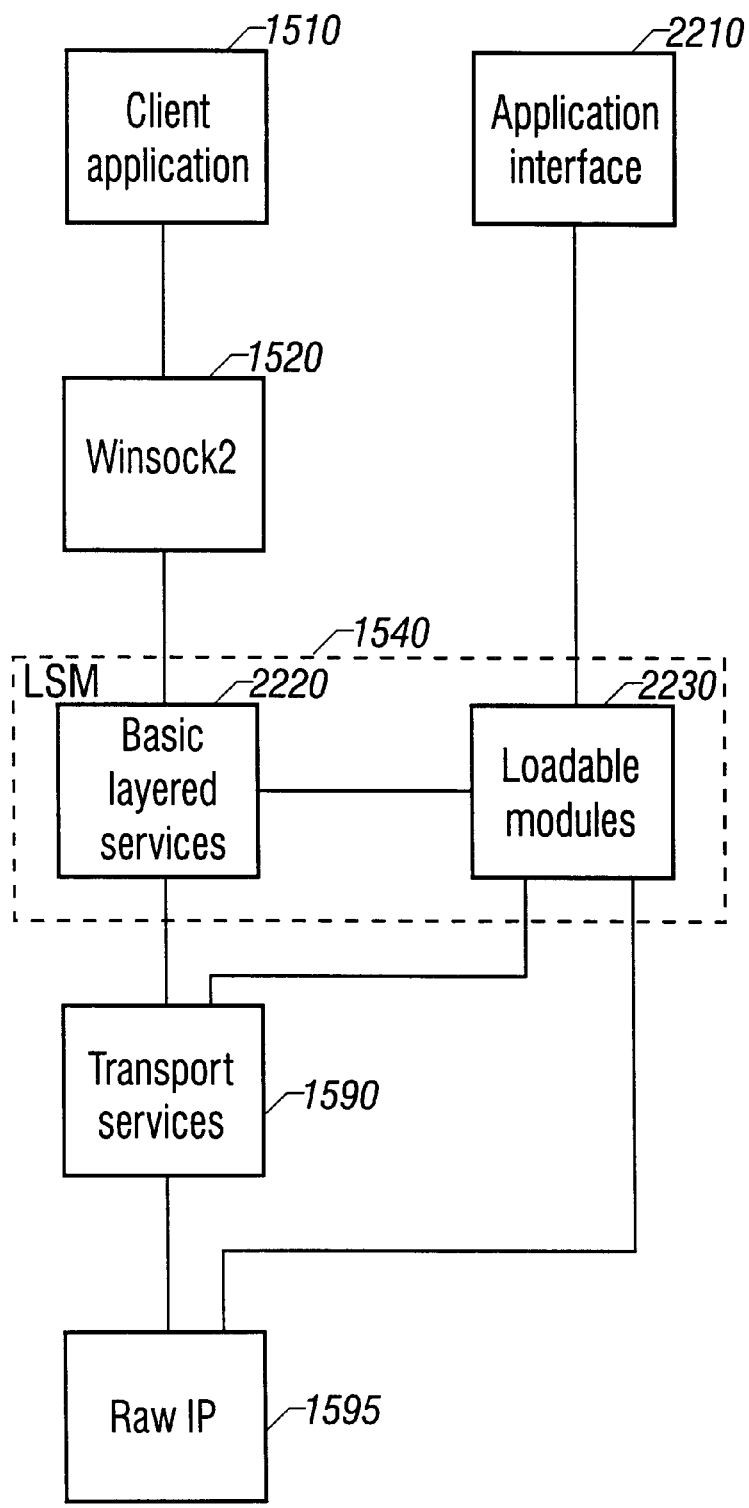
FIG. 22 shows software modules, including loadable modules, in a layered service module.

Referring to FIG. 22, LSM 1540 includes basic layered services 2220 and possibly one or more loaded modules 2230. In this embodiment, which is implemented using the Windows95 or Windows NT operating system, a loadable software module is a Dynamically Linked Library (DLL). When LSM 1540 receives a local pathname of a loadable module, that is, the pathname of a DLL, LSM 1540 loads the DLL. The DLL uses an agreed-upon API, and includes a module descriptor which allows basic layered services 2220 to determine what routines that DLL provides. The module descriptor is also used to allow proper chaining of modules if more than one routine needs to be used in sequence. For example, a decompression routine and a decryption routine both may need to be used on an inbound data stream, and the order of applying those routines is significant to their proper operation. Using the module descriptor, LSM 1540 determines under what circumstances a routine in the loadable module should be invoked.

Use of such a loadable module can be understood by an example in which the module is used for decompression of data flowing from the communication server to the client computer. In this case, loadable module 2230 associated with the communication server includes an entry point used to filter an incoming data stream. Each input buffer read by basic layered services 2220 from transport services 1590 is passed to the inbound filtering routine in loadable modules 2230. The result of applying the routine is then passed to Winsock2 1520 and then to client application 1510. Entry points can also be associated with and invoked by LSM 1540 in a variety of situations, for instance, when connecting, closing, reading from, and writing to a socket.

Referring still to FIG. 22, loadable modules communicate with basic layered services 2220. In the example introduced above in which a loadable module is used for decompression of data, compressed data received by the client computer is passed from basic layered services 2220 to loadable module 2230, where it is decompressed, and decompressed data is passed back from loadable module 2230 to basic layered services 2220. The decompressed data is then sent to client application 1510. Similar data flow is used for a loadable module that provides decryption routines.

A loadable module may also communicate directly with transport services 1590. For example, a loadable module may multiplex multiple socket connections over a single TCP connection. In this case, basic layered services 2220 would provide outbound data to loadable module 2230, and loadable module 2230 would provide that data, after multiplexing it with data from other connections, to TCP module 1660.

A loadable module may also essentially implement a transport service, for instance, if a proprietary transport layer protocol is used with a particular server computer. Such a protocol may be used, for example, to provide streaming audio data in an efficient manner. In this case, a loadable module 2230 communicates directly with Raw IP 1595.

A loadable module may also communicate with an application interface 2210 which is a separate application from client application 1510 which initiated the connection. In this way, a customized client server application may be initiated. For example, a customized user interface, particular to a server computer, can be launched by a loadable module. The loadable module then provides an interface for application interface 2210 and communication services needed by application interface.

The description of the third and fourth embodiments referred to a single database entry in database 1620 being associated with a server computer. Several remote communication server computers may in fact be associated with a particular server computer. In this case, the file in address database 1622 associated with that server computer will have multiple records of the format shown in FIG. 17b. In the third embodiment, directory manager 1610 implements a selection of which communication server address to provide to LSM 1540. For instance, directory manager 1610 may implement a round-robin scheme in which each request by LSM 1540 to connect to the server computer results in a different remote communication server being used than in the previous connection. Directory manager 1610 may also implement another selection method, for example based on other information recorded in the site information field of the database. For instance, the site information field may indicate that one remote communication server is appropriate for clients with a high data rate connection to the remote communication server, while another communication server is appropriate for clients with slow or high-latency connections.

Also in the description of the third and fourth embodiments, the system was described in terms of a local computer establishing an enhanced communication path to a server computer. In the first two embodiments, an enhanced communication path used an enhanced transport layer protocol, that is the XTP protocol, or multiplexing of socket connections from a client application using a single TCP or XTP. In the third and fourth embodiments, communication between a local computer and a remote server may be enhanced in a wide variety of ways, not necessarily involving transport layer communication protocols. For example, application layer enhancements to the communication between the client computer and the remote computer may be used. For instance, if a server computer supports a catalog shopping service, communication passing between the local computer and the server computer may involve relatively low level data requests, for example for product descriptions, prices, etc. The user, however, may be presented a full-featured user interface within a standard Web browser. Software in the layered service module, or in a loadable module, provides the interface between the Web browser and the low level communication passed between the client computer and the server computer. Other enhanced communication approached implemented at various layers, from the data link layer to the application layer, may be used in the described, or related, embodiments.

In the fourth embodiment, if multiple remote communication servers are available for a server computer, the entire list is provided to LSM 1540. A loadable module is then be used to select the appropriate communication server for each connection.

Also in the fourth embodiment, other forms of loadable modules may be used. For instance, rather than DLLs, Java applets may be used.

In the third and fourth embodiments, database 1620 is implemented using text files stored on the client computer's file system to store database records and loadable software modules. An object database may alternatively be used. For instance, each record may be stored as a binary file including a tag and length for each field, multiple records may be stored in a single file, or relational tables may be used. Furthermore, if loadable software modules are used, database 1620 may be used to store the modules themselves, rather than using the local computer's file system.

Also in the third and fourth embodiments, use of the cooperating name resolution service 1650 and layered service module 1540 allows a client application to use host names that would not be resolved by an Internet DNS. For instance, referring to FIG. 15, a "friendly" name can be passed from client application 1510 to Winsock2 1520. The friendly name is passed to directory module 1550 which returns a data structure which includes the address in the form needed by the appropriate transport services.

An alternative approach to determining whether a server computer can be accessed through a remote communication server involves a client computer (or proxy computer) initially retrieving information from a server computer using TCP. Then, based on application layer data transferred over the TCP connection, the client computer determines the address of a remote communication server. In the case of http-based data connections, the address of the remote communication server is provided as part of the response to a HTTP request. The server address can be embedded in the stored files on the server computer, thereby being provided to the client computer as part of a normal retrieval of data by a standard Web server application. Alternatively, the remote communication server address can be added by the Web server application prior to sending a response to the client. If the client receives a remote communication server address in the data, it updates its local tables and uses the remote communication server for subsequent communication with the server computer.

Figure 23:
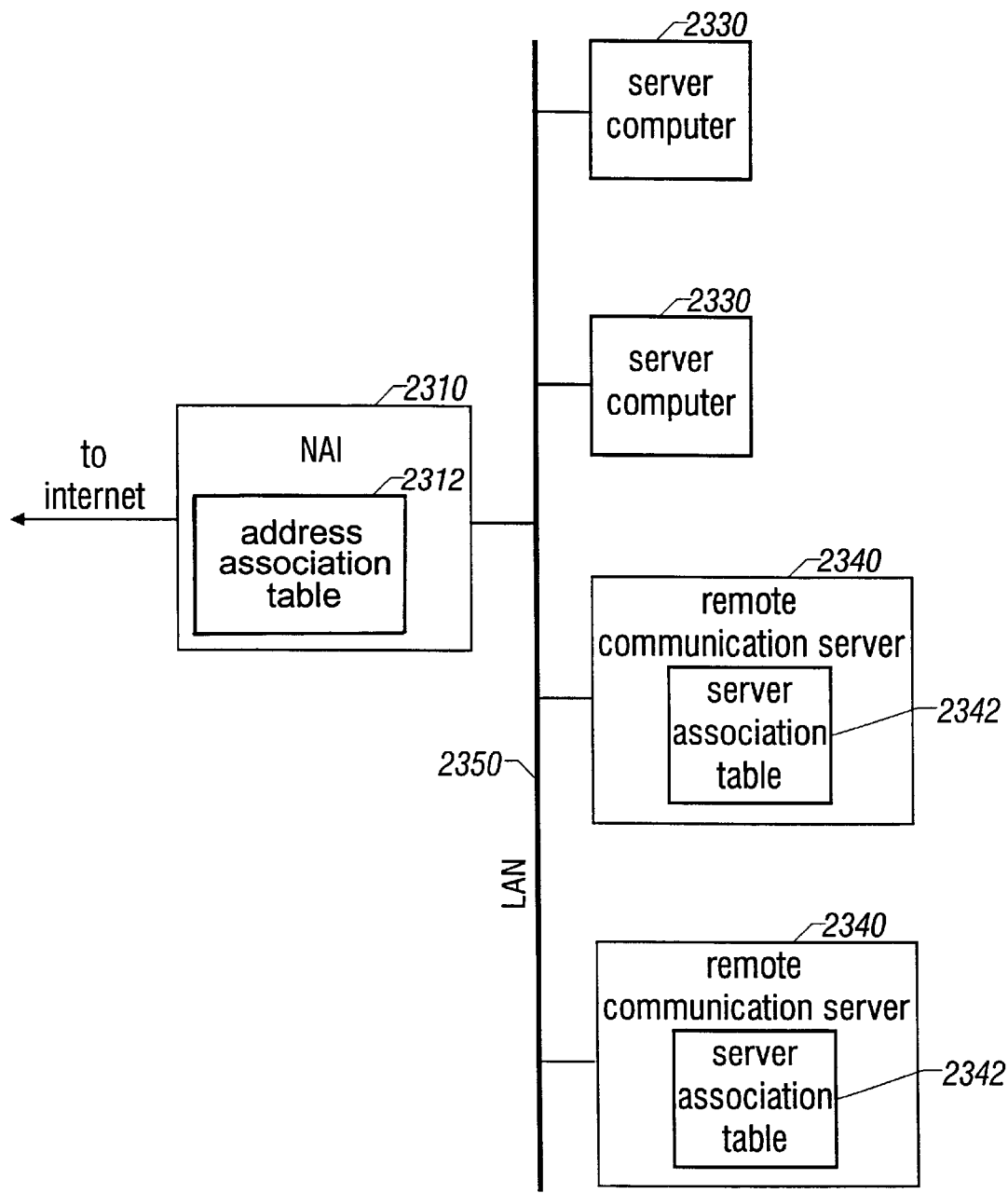
FIG. 23 shows a network address translator coupling a server computers and remote communication servers to the Internet.

Referring to FIG. 23, in an alternative arrangement, remote communication servers 2340 can be used to balance load on a set of server computer in conjunction with a network address translator (NAT) 2310. NAT 2310 is connected between the Internet and a LAN 2350. Network addresses of computers on LAN 2350 are not necessarily known to computers, such as client computers, on the Internet. In order to communicate with a computer on LAN 2350, a computer on the Internet directs communication to a network address to which NAT 2310 responds and NAT 2310 forwards communication between the computer on the Internet and the computer on LAN 2350. Internally, NAT 2310 maintains an address association table 2312 which maps Internet network addresses to local network addresses which are valid on LAN 2350. In the simplest case, the table has a one-to-one correspondence between Internet network addresses and local network addresses. Address association table 2312 can also have multiple local network addresses associated with a single Internet network address. In this case, NAT 2310 chooses one of the multiple local network addresses to match to the Internet network address when it receives communication from a remote computer. For example, NAT 2310 can use a round-robin selection approach to choose a particular local network address. NAT 2310 can therefore balance the load of requests to communicate with a single Internet network address by passing different requests to different computers on LAN 2350. Once NAT 2350 has connected a remote computer on the Internet to a particular local computer on LAN 2350, it connects subsequent requests from that remote computer to the same local computer on LAN 2350 until a minimum time has elapsed since the remote computer has closed all its communication paths to the local computer.

Referring still to FIG. 23, LAN 2350 couples two or more remote communication servers 2340 and two or more server computers 2330 to NAT 2310. Server computers 2330 share a common network address and remote communication servers 2340 share anther network address. Requests from a client system to communicate directly with a server computer 2330 are handled by NAT 2310 in the manner described above. Requests from a client system to communicate with a remote communication server are also handled by NAT 2340. NAT 2340 handles these requests by choosing one of the remote communication servers 2340 and passing communication between the client system and the remote communication server. This communication includes the XTP communication over which the client system sends requests to communicate with server computers.

When a remote communication server 2340 receives a requests to communicate with a server computer, the request identifies the server computer using a network address that would be valid from the Internet, that is, using an address that would be translated by NAT 2340 if the client system were to try to contact the server computer directly. Therefore, remote communication server maintains a server association table 2342 containing the Internet network address for the server computers associated with their local network addresses. When remote communication server 2340 receives a requests to communicate with a server with a particular Internet network address, the remote communication server accesses its server association table to determine whether it provides communication services for that server computer and, if so, to determine a local network addresses correspond to that server. Server association table 2342 also includes a record of the particular server computers matched to requests from particular client systems in order that the same server computer can be uses for a series of requests to communicate.

In the arrangement shown in FIG. 23, address translation therefore occurs at two levels. First, NAT 2310 translates an Internet network address for a remote communication server into one of the local network addresses of remote communication servers. Then, when a client requests to communicate with a server computer, the remote communication server translates the Internet network address of the requested server computer into one of the local addresses of the server computers on the LAN.

Figure 24:
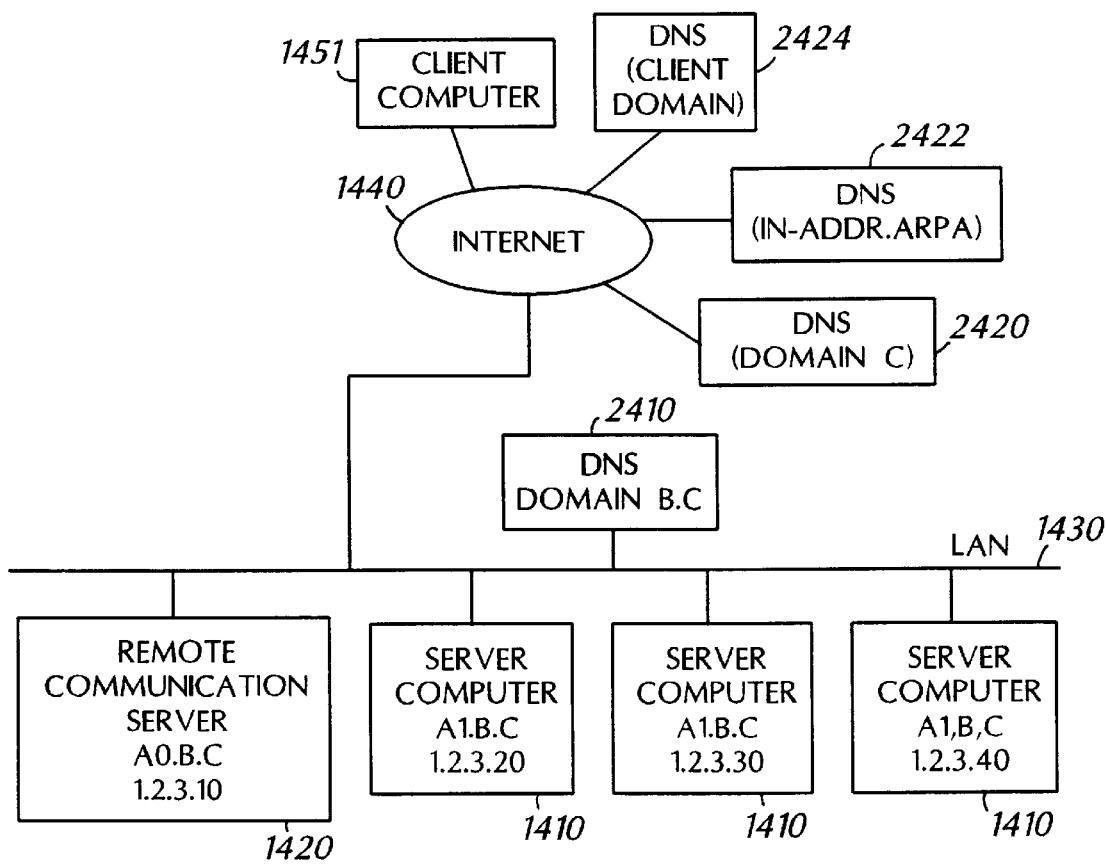
FIG. 24 illustrates a client computer coupled over the Internet to a server LAN, and a number of Domain Name Servers.

Referring to FIG. 24, an alternative embodiment uses standard Internet Domain Name Servers (DNSs) to provide information to client computers related to remote communication servers which provide communication services for particular server computers. Information related to operation and configuration of standard DNSs is found in Requests For Comments (RFCs) 1034, and 1035.

In FIG. 24, client computer 1451 is coupled to remote communication server 1420 and server computers 1410 via Internet 1440 in an arrangement similar to that shown in FIG. 14. For illustration, the host names of server computers 1410 are A1.B.C, A2.B.C, and A3.B.C and have IP addresses 1.2.3.20, 1.2.3.30, and 1.2.3.40, respectively, and the host name and IP address of remote communication server 1420 is A0.B.C and 1.2.3.10.

A domain name server (DNS) 2410 is coupled to LAN 1430 and provides name resolution services for the domain B.C which corresponds to a range of IP addresses of the form 1.2.3.* and provides address resolution services for the domain 3.2.1.IN-ADDR.ARPA. A DNS 2420 is coupled to Internet 1440 and provides name resolution services for the domain C. Another DNS 2442 is coupled to Internet 1440 and provides name resolution services for the domain IN-ADDR.ARPA, the standard top-level domain used for reverse name resolution (host lookup by IP address rather than host name). Client computer 1451 is configured to use a DNS 2424 as its default DNS.

Figure 25:
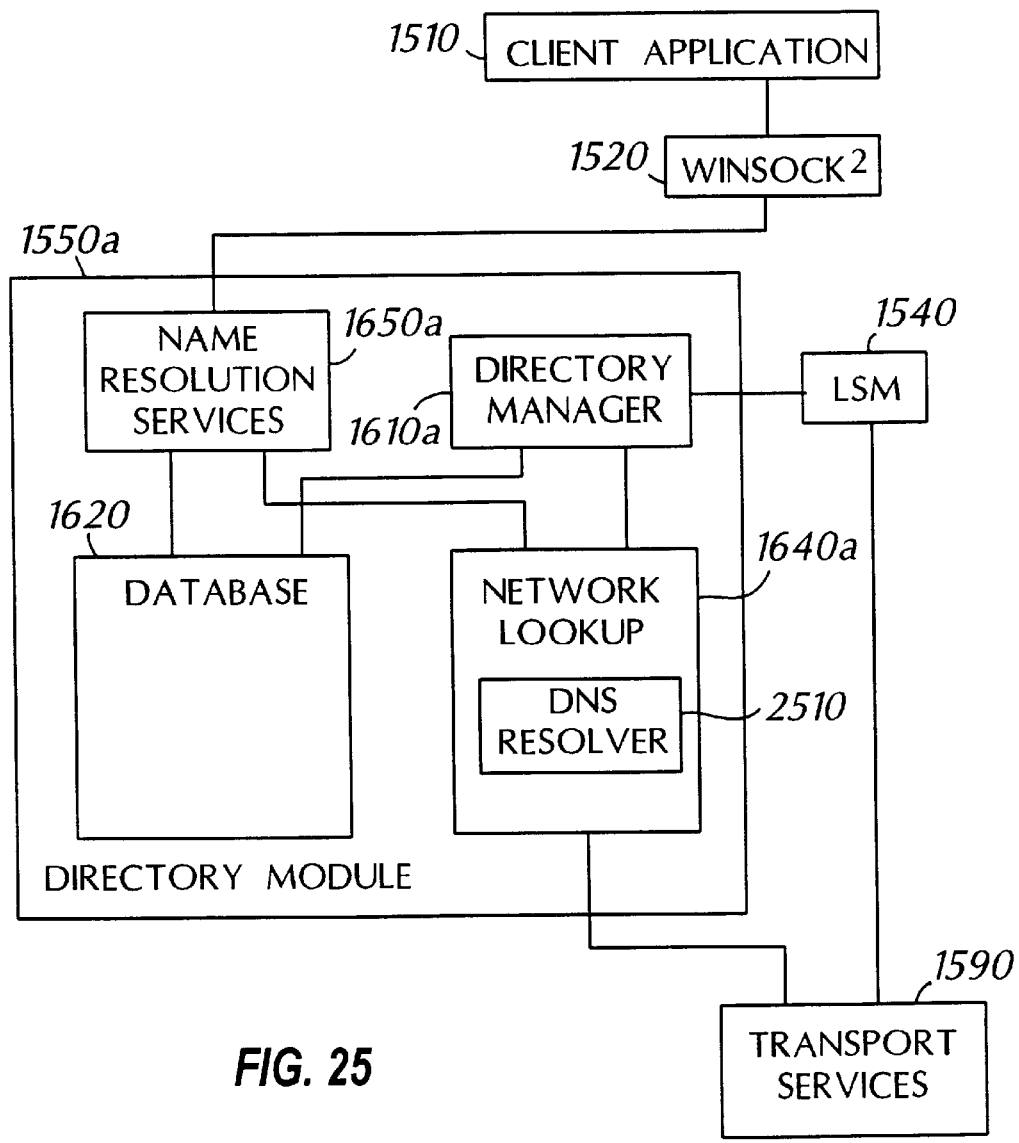
FIG. 25 shows software modules on a client computer, including a DNS resolver that is part of a directory module.

Referring to FIG. 25, the arrangement of software modules executing on client computer 1451 is similar to that shown in FIG. 16. In this embodiment, network lookup module 1640a includes a DNS resolver 2510 that is used to access server information from DNS 2424. Both directory manager 1610a and name resolution service 1650a are coupled to network lookup 1640a.

In operation, when client application 1510 requests resolution of a host name from Winsock2 1520, Winsock2 1520 passes the name resolution request to a name resolution service. In this embodiment, Winsock2 is configured to use name resolution service 1650a as the first service to use when attempting to resolve a host name.

As an illustrative example, client application 1510 requests resolution of host name A1.B.C. Name resolution service 1650a receives the request from Winsock2 1520 and first examines database 1620 to see whether the information related to host A1.B.C is already stored. If the information, including the host's IP address (1.2.3.20) is available, name resolution service 1650a returns the host's IP address to Winsock2 1520.

If information related to host A1.B.C is not already stored in database 1620, name resolution service 1650a attempts to retrieve information about the host from an Internet DNS. In particular, name resolution service 1650a initiates a query to DNS resolver 2510 to obtain the information.

DNS resolver 2510 makes a standard query to DNS 2424 (its default DNS) to obtain the IP address associated with the host name A1.B.C (QNAME=A1.B.C, QTYPE=A; see RFC 1035). DNS 2424 either has cached the information from a previous request and provides the information immediately, or requests the information from another DNS, such DNS 2410, the DNS for the B.C domain. DNS 2424 returns the IP address 1.2.3.20 in response to the query. Following standard operation of an Internet DNS, if DNS 2424 did not know of a DNS for the B.C domain, it could locate a DNS for the B.C domain recursively, for instance, by first querying a DNS 2420 that serves the C domain.

If client application 1510 instead specifies a host in a communication request directly by its IP address, then DNS resolver 2510 does not have to perform name resolution since the IP address is known.

When client application 1510 attempts a connection through Winsock2 1520 to a resolved host (a host whose IP address is known, for instance, as a result of a prior name resolution by DNS resolver 2510), Winsock2 passes the request directly to LSM 1540. LSM 1540 uses directory manager 1610a to determine whether a remote communication server is associated with that server address. For example, client application 1510 can request to communicate with IP address 1.2.3.20. LSM 1540 passes the IP address to directory manager 1610a which looks up that IP address in database 1620. If the database already contains information related to a host with IP address 1.2.3.10 (that is host A1.B.C) it returns the IP address of its remote communication server (1.2.3.10).

If directory manager 1610a does not locate the server address in database 1620, it initiates a DNS request by DNS resolver 2510 to obtain information related to the server computer with IP address 1.2.3.20.

In obtaining information related to the server computer with IP address 1.2.3.20, DNS resolver 2510 makes a query for information related to the host with that IP address using standard reverse DNS conventions. In particular, DNS resolver 2510 makes a query to DNS 2424 for the name 20.3.2.1.IN-ADDR.ARPA and records of type "TXT" (QNAME=20.3.2.1.IN-ADDR.ARPA, QTYPE=TXT). DNS 2424 either has cached the information from a previous request which it provides immediately, or requests the information from another DNS, such as DNS 2410, the DNS for the 3.2.1.IN-ADDR.ARPA domain. In standard operation of Internet DNS, DNS 2424 can locate a DNS for the 3.2.1.IN-ADDR.ARPA domain recursively by starting at DNS 2422 that serves as the top-level DNS for the IN-ADDR.ARPA domain.

After DNS 2424 returns one or more records of the TXT type to DNS resolver 2510, network lookup module 1640 parses the TXT records to determine whether any have the syntax of a record which contains information related to a remote communication server associated with host 1.2.3.20. In this case, one or the records identifies host A0.B.C with IP address 1.2.3.10 as being a remote communication server for the server computer with address 1.2.3.20. Network lookup provides this information to directory manager 1610 which stores the information in database 1620 and provides the address of the remote communication to LSM 1540.

Figures 26, 27:
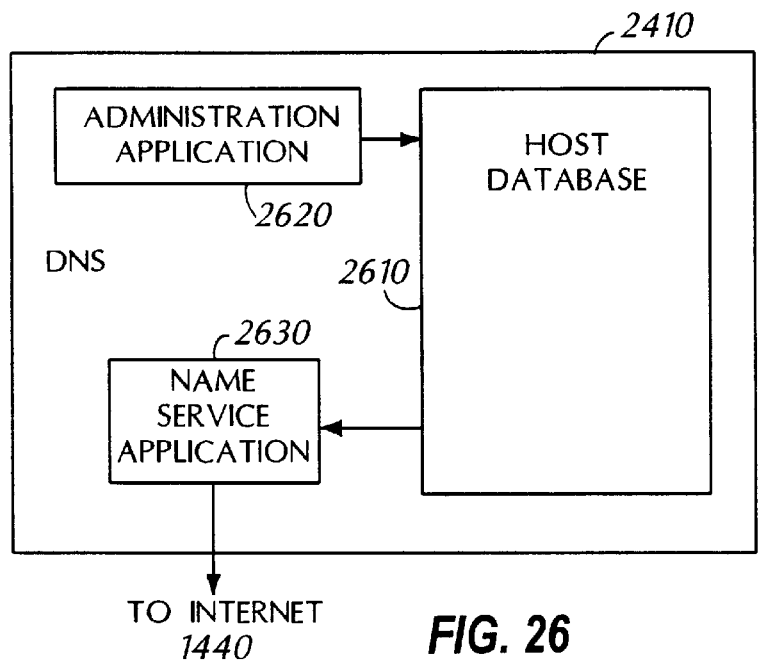
FIG. 26 shows the software modules of a domain name server.
FIG. 27 illustrates exemplary records in a host database.

Referring to FIG. 26, DNS 2410 is a standard domain name server that includes a name server application 2630 and an administration application 2620 both coupled to a host database 2610. An administrator of DNS 2410 uses administration application 2620 to add and update records associated with server computers 1410 (FIG. 24). Other computers (such as other DNS computers) access information in host database 2610 over Internet 1440 through name server application 2630.

Referring to FIG. 27, host database 2610 includes multiple records for each computer in its domain. For instance, records associated with server computer A1.B.C include a host name record 2710, which associates host name A1.B.C with IP address 1.2.3.20, and a TXT record 2720 which associates the host with name A1.B.C with the remote communication server with host name A0.B.C. The data field begins with the string "SSS:" which signifies that the record identifies a remote communication server. This syntax allows network lookup 1640a (FIG. 25) to distinguish this type of record from other TXT records that are not related to remote communication servers.

Host database 2610 also includes a record that allows access to the name of the remote communication server via the IP address of the server computer. For instance, record 2730 is a pointer record which associates the name 20.3.2.1.IN-ADDR.ARPA with the host name A1.B.C. A DNS uses this association to then retrieve TXT record 2720 for the host. Host database 2610 can alternatively include a TXT record 2740 that directly associates the name 20.3.2.1.IN-ADDR.ARPA with remote communication server A0.B.C.

In other embodiments, additional information can be stored in the data field of the TXT record. For instance, in one alternative embodiment, the protocol and port index on the remote communication server to which communication should be initiated is explicitly identified in the TXT record. Also, remote communication servers can be specified using their IP addresses rather than their host names, thereby avoiding the additional host name lookup required to translate the host name of a remote communication server to its IP address.

In another alternative embodiment, the TXT record for a server computer includes a "time to live" (TTL) field that specifies the duration that a client computer can use the record. After the TTL interval expires, measured from the time that the client computer obtained the record from a DNS server, the client computer requests a new copy of the record to determine the remote communication server to use to communicate with a the server computer. The new TXT record may identify a different remote communication server for the server computer. In an arrangement in which multiple remote communication servers are configured to communicate with a particular server computer, the DNS server that provides the TXT record may identify a different remote communication server in response to different requests, for instance, to distribute the load on the available remote communication servers. A client computer that receives a particular TXT record will use the remote communication server identified in that record for the TTL interval, and then will request a new TXT record, which may identify a different remote communication server. Note that the TXT record itself may have a separate time to live quantity associated with the time that a DNS server servicing a client, such as DNS 2424, keeps a TXT record before it expires. The TTL field in the TXT record is associated with the interval measured from the time that a client receives the record from a DNS, such as DNS 2424, not the time interval measured from the time the original DNS, such as DNS 2410, provided the record in the first place.

In another alternate embodiment, at the time that DNS resolver 2510 makes a query to determine the IP address associated with a particular host name, DNS resolver 2510 also makes a query for additional information related to the host A1.B.C. In particular, it requests all records of type "TXT" (QTYPE=TXT) that are associated with that host. DNS 2424 returns zero or more records of this type to DNS resolver 2510 using the same mechanism by which it provided the host address records. Network lookup module 1640 parses the TXT records to determine whether any have the syntax of a record which contains information related to a remote communication server associated with host A1.B.C. In this case, one of the records has the proper syntax and identifies host A0.B.C as being a remote communication server for server computer A1.B.C. Network lookup 1640a provides this information to name resolution service 1650a which stores the information in database 1620.

Other combinations of elements described in the above embodiments may alternatively be used. For instance, the first embodiment uses a client computer which accesses the Internet through a gateway computer. Other described embodiments combine the functionality of the client computer and the gateway computer into a single computer. In embodiments that combine the functions, separate computers could equivalently be used. Similarly, the functions of a remote communication server and a server computer may be hosted on separate computers, or hosted on a single computer. If their function is hosted on a single computer, the communication passing between the remote communication server and the server computer does not have to pass over a data network.

In the described embodiments, information related to a server computer, and in particular information associating a server computer with a remote communication server, is stored in some combination of a directory server, a list server, or on the server computer itself. Other storage locations for the information may equivalently be used. For example, information related to loadable modules may be stored on a centralized directory server. Also, the function of a DNS may be extended so that, in addition to providing a translation of a host name to its associated IP address, additional information, including an address of a remote communication server, may be provided. In the case that additional information is stored on the DNS computers and retrieved along with the IP address of a server computer, there is no explicit request for the information. The additional information is provided in response to the request for the server computer's IP address. The address of a remote communication server associated with a server computer may also be provided without an explicit request in other situations. For example, the information may be provided in the header of information retrieved from a server computer. If the server computer is a Web server, the address of a remote communication server associated with it may be provided in the header of HTML documents retrieved from the server. The client computer is then responsible for detecting and extracting the information from those HTML documents as they are passed to an application.

If the function of a remote communication server and a server computer are combined on a single computer, the host portion of the address of a server computer and the remote communication server would, in general, be the same. Communication can be delivered to the system on the single computer by using different port indices for the function of the server computer and the function of the remote communication server. Alternatively, or in addition to, using a different port index, communication from the client computer to the server computer can use a different protocol index than communication from the client computer to the remote communication server. Communication can be routed to the appropriate system on the single computer based on the protocol index.

In the above embodiments, there may be some remote communication servers that do not advertise their address in a directory server, in a list server, or in a site file. For example, access to a particular remote communication server may be limited to particular subscribers of a service while others use the standard TCP interface. In such a case, a manual entry of the remote communication server information may be possible. Also, in the cases that a directory server is used, requests from a gateway computer may be batched and communication between a gateway computer and a directory server can occur less frequently thereby reducing the load on the directory server.

In other related embodiments, multiple alternative protocols can be supported. Instead of passing all non-TCP communication through an XTP module, a matrix switch feeding multiple protocol modules can be used. The redirector then also determines which protocol module to use. Software modules, including the "hook," the redirector, or the HTTP Engine, may be incorporated into a layered Winsock protocol under the Windows 95 or Windows NT operating system.

Additional application protocol spoofing can be performed. For example, an FTP module can be inserted between a redirector and the XTP module to spoof FTP communication in the same way that a HTTP Engine is used to spoof the HTTP application protocol. Various techniques may be used to initialize a socket using an alternative protocol. Rather than recording requests in a tracing buffer, the socket may be initialized directly into a desired state.

In addition to adding alternative transport protocols which use IP, replacing the IP layer as well may be feasible in some situations. For example, if IP is layered on an ATM network, both TCP and IP can be bypassed in a similar arrangement to that used to bypass TCP in the described embodiments.

Embodiments of this invention can make use of multiple TCP segments rather than using XTP or some other alternative transport protocol. In such embodiments, application protocol spoofing, multiplexing, and server site aggregation (service of multiple server computers using a single remote communication server) can be used over TCP channels. In addition, the parameters of the TCP connections on different segments may be different resulting in improved end-to-end characteristics.

Other embodiments may address channel characteristics other than throughput and latency, or address throughput and latency using different types of communication techniques. For example, achieving low latency over high capacity but high delay channels may best be achieved by using an alternative transport protocol that makes use of forward error correction rather than error detection and retransmission. In addition, the alternative protocols can be used to control a quality of service on certain data streams while still allowing the application to use TCP without modification.

Software used to implement various components of the invention may be stored on a variety of computer readable media, including fixed or removable magnetic or optical disks. Alternatively, it may be stored remotely from the computer on which the modules execute, and accessed using a data network.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for communicating between a client communication system and a plurality of server communication systems over a data communication network comprising:

accepting a request to communicate with one of the server communication systems including receiving an identification of said server communication system;

using the identification of said server communication system, determining a set of one or more transport layer protocols for which the server communication system is configured to communicate and selecting one of the set of transport layer protocols for communicating with the server communication system; and communicating with the server communication system over the data communication network using the selected transport layer protocol.

2. The method of claim 1 wherein determining the set of transport layer protocols includes retrieving information related to the server communication system from a directory service computer over the data communication network, and wherein the address of the directory service computer is related to the identification of the server communication system.

3. The method of claim 2 wherein the identification of the server communication system includes a network address of the server communication system, and determining the set of transport layer protocols includes determining the address of the directory service computer from the network address of the server communication system.

4. The method of claim 3 wherein the network address of the server communication system includes an Internet Protocol address of said system, and the directory service computer provides an Internet Domain Name Service.

5. The method of claim 3 wherein the network address of the server communication system includes a host name of said system, and the directory service computer provides an Internet Domain Name Service.

6. The method of claim 1 wherein determining the set of protocols further includes monitoring prior communication with the server communication system and updating the set of transport layer protocols based on the monitored communication.

7. The method of claim 6 wherein monitoring the prior communication includes detecting portions of application layer communication between an application and the server communication system.

8. A client communication system coupled to a data network for communicating with a plurality of server communication systems each configured to communicate with the client communication system using at least one of a plurality of transport layer protocols, comprising:

a transport layer module implementing the plurality of transport layer protocols for communicating with the server communication systems;

a layered communication module coupled to the transport layer module and including a protocol selector for receiving a request to communicate with a requested one of the plurality of server communication systems and, using the request to communicate, choosing one the plurality of transport layer protocols for communication with the requested server system;

a directory service module coupled to the layered communication module for accessing over the data network information related to the transport layer protocols with which the requested server communication system is configured to communicate.

9. The communication system of claim 8 wherein the directory service module includes a module for retrieving the information related to the transport layer protocols from a directory service computer over the data network.

10. The communication system of claim 9 wherein the directory service module is an Internet domain name resolution module, and the directory service computer is an Internet domain name server.

11. Software stored on a computer readable medium for causing a computer to perform the functions of:

accepting a request to communicate with one of a plurality of server communication systems, including receiving an identification of said server communication system;

using the identification of said server communication system, determining a set of one or more transport layer protocols for which the server communication system is configured to communicate and selecting one of the set of transport layer protocols for communicating with the server communication system; and communicating with the server communication system over the data communication network using the selected transport layer protocol.

12. The software of claim 11 wherein determining the set of transport layer protocols includes retrieving information related to the server communication system from a directory service computer over the data communication network, and wherein the address of the directory service computer is related to the identification of the server communication system.

* * * * *